(12) United States Patent
Tournatory et al.

(10) Patent No.: US 9,735,574 B2
(45) Date of Patent: Aug. 15, 2017

(54) SWITCHING REGULATOR CIRCUITS AND METHODS

(71) Applicant: GAZELLE SEMICONDUCTOR, INC., Redwood City, CA (US)

(72) Inventors: David Christian Gerard Tournatory, Redwood City, CA (US); Kevin Kennedy Johnstone, Mountain View, CA (US)

(73) Assignee: Gazelle Semiconductor, Inc., Sunnyvale, CA (US)

( * ) Notice: Subject to any disclaimer, the term of this patent is extended or adjusted under 35 U.S.C. 154(b) by 177 days.

(21) Appl. No.: 14/144,169

(22) Filed: Dec. 30, 2013

(65) Prior Publication Data

US 2014/0210266 A1 Jul. 31, 2014

Related U.S. Application Data

(63) Continuation-in-part of application No. 13/794,231, filed on Mar. 11, 2013, now Pat. No. 9,086,708.

(60) Provisional application No. 61/747,988, filed on Dec. 31, 2012.

(51) Int. Cl.
*G05F 1/00* (2006.01)
*H02J 3/00* (2006.01)
*H02M 3/158* (2006.01)
*H02M 3/156* (2006.01)

(52) U.S. Cl.
CPC ............... *H02J 3/00* (2013.01); *H02M 3/158* (2013.01); *H02M 2003/1566* (2013.01); *Y10T 307/406* (2015.04)

(58) Field of Classification Search
CPC ............... H02M 3/1584; H02M 3/158; H02M 2003/1566; H02J 3/00; Y10T 307/406
USPC ................ 323/268, 271, 272, 350, 225, 267
See application file for complete search history.

(56) References Cited

U.S. PATENT DOCUMENTS

| 4,673,889 A | 6/1987 | Cini et al. |
| 5,418,707 A | 5/1995 | Shimer et al. |
| 5,570,276 A | 10/1996 | Cuk et al. |
| 5,581,451 A | 12/1996 | Ochiai |
| 5,592,071 A | 1/1997 | Brown |

(Continued)

FOREIGN PATENT DOCUMENTS

| EP | 1172924 A3 | 2/2002 |
| EP | 2002558 B1 | 9/2011 |

(Continued)

OTHER PUBLICATIONS

International Search Report (from a corresponding foreign application), PCT/US2013/078355, mailed Apr. 8, 2014.

(Continued)

*Primary Examiner* — Alex Torres-Rivera

(57) ABSTRACT

The present disclosure includes switching regulator circuits and methods. In one embodiment, a first switching regulator stage receives a first input voltage and produces a first voltage on a first node. A second switching regulator stage receives the first input voltage and produces a second voltage on a second node. A capacitor includes a first terminal coupled to the first node and a second terminal coupled to the second node, and the first switching regulator stage and the second switching regulator stage are configured to set a first voltage on the first node and to set a second voltage on the second node.

43 Claims, 27 Drawing Sheets

(56) References Cited

U.S. PATENT DOCUMENTS

| | | | |
|---|---|---|---|
| 5,615,093 A | 3/1997 | Nalbant | |
| 5,770,940 A | 6/1998 | Goder | |
| 5,929,692 A | 7/1999 | Carsten | |
| 6,396,137 B1 | 5/2002 | Klughart | |
| 6,605,931 B2* | 8/2003 | Brooks | H02M 3/156 323/272 |
| 6,894,464 B2 | 5/2005 | Zhang | |
| 6,943,535 B1* | 9/2005 | Schiff | H02M 3/1584 323/244 |
| 6,965,219 B2* | 11/2005 | Brooks | H02M 3/1584 323/272 |
| 6,987,380 B1 | 1/2006 | Lee | |
| 7,250,746 B2 | 7/2007 | Oswald et al. | |
| 7,432,614 B2 | 10/2008 | Ma et al. | |
| 7,486,060 B1 | 2/2009 | Bennett | |
| 7,499,682 B2 | 3/2009 | Rozenblit et al. | |
| 7,538,535 B2 | 5/2009 | McDonald et al. | |
| 7,730,340 B2 | 6/2010 | Hu et al. | |
| 8,085,020 B1 | 12/2011 | Bennett | |
| 8,248,152 B2 | 8/2012 | Dennard et al. | |
| 2005/0007086 A1 | 1/2005 | Morimoto | |
| 2005/0200404 A1 | 9/2005 | Bernardon | |
| 2007/0120543 A1* | 5/2007 | Caldwell | H02M 1/10 323/272 |
| 2007/0195876 A1 | 8/2007 | Prodic | |
| 2008/0197827 A1 | 8/2008 | Wrathall | |
| 2008/0265862 A1* | 10/2008 | Burdenski | H02M 3/1584 323/350 |
| 2009/0108821 A1* | 4/2009 | Standing | H02M 3/1584 323/272 |
| 2010/0085024 A1* | 4/2010 | Houston | H02M 3/1584 323/281 |
| 2011/0204862 A1 | 8/2011 | Prodic et al. | |
| 2013/0200849 A1 | 8/2013 | Crebier et al. | |
| 2013/0214752 A1 | 8/2013 | Tournatory | |
| 2013/0214858 A1 | 8/2013 | Tournatory et al. | |
| 2014/0015500 A1* | 1/2014 | Babazadeh | H02M 3/1584 323/272 |
| 2014/0049235 A1 | 2/2014 | Li et al. | |

FOREIGN PATENT DOCUMENTS

| | | |
|---|---|---|
| EP | 2493060 A1 | 8/2012 |
| WO | 2009067591 A2 | 5/2009 |
| WO | 2011-128849 A2 | 10/2011 |
| WO | 2013122782 A1 | 8/2013 |

OTHER PUBLICATIONS

International Search Report and Written Opinion—PCT/US2014/65917—ISA/US—Feb. 11, 2015.

Josh Wibben et al, "A High-Efficiency DC-DC Converter Using 2 nH Integrated Inductors", IEEE Journal of Solid-State Circuits, Jul. 7, 2007, pp. 844-854, vol. 43, No. 4.

International Search Report (from a corresponding foreign application), PCT/US2014/45812, mailed Dec. 5, 2014.

* cited by examiner

SWITCHING REGULATOR CIRCUITS AND METHODS

CROSS-REFERENCE TO RELATED APPLICATIONS

This application is a continuation-in-part of U.S. patent application Ser. No. 13/794,231 entitled "Switching Regulators," filed Mar. 11, 2013, which claims the benefit of U.S. Provisional Application No. 61/747,988, filed Dec. 31, 2012. This application further claims the benefit of U.S. Provisional Application No. 61/747,988, filed Dec. 31, 2012. The disclosure of U.S. patent application Ser. No. 13/794,231, filed Mar. 11, 2013 is hereby incorporated by reference herein in its entirety. The disclosure of U.S. Provisional Application Ser. No. 61/747,988, filed Dec. 31, 2012 is hereby incorporated by reference herein in its entirety.

FIELD

The present disclosure relates to switching regulator circuits and methods.

BACKGROUND

FIG. 1 illustrates a conventional multi-phase step-down switching regulator. One significant problem associated with using conventional single- and multi-phase regulators to achieve high slew rates is that such regulators exhibit asymmetric slew rates that can adversely impact system performance. Furthermore, at high switching frequencies, such circuits may require impractically small inductor values or an impractically high number of phases.

FIG. 2 illustrates the configuration of a multi-phase step-down switching regulator during positive slew. For input voltage VIN and output voltage VOUT, a conventional N-phase step-down switching regulator will command a maximum positive output current slew-rate by activating switches to short the switch node(s) SW1 and SW2 through SWN to VIN. This results in the sum of the inductor(s) current(s) to slew at the rate:

$$D(ISUM)/dt = N*(VIN - VREF)/L$$

FIG. 3 illustrates the configuration of a conventional multi-phase step-down switching regulator during negative slew. To command a maximum negative current slew rate, the controller 302 activates the switches to short the switch node(s) SW1 and SW2 through SWN to ground. This results in the sum of the inductor(s) current(s) to slew at the rate:

$$D(ISUM)/dt = N*(-VREF)/L$$

The positive output current slew rate is therefore a factor of (VIN−VREF)/(VREF) higher than the negative output current slew rate. For example, if VIN is at 12V and VOUT at 1V (e.g., low duty cycle case) regardless of the number of phases used, a traditional step-down switching converter features a maximum positive output current slew rate (SRP) that is 11 times faster than its maximum negative output current slew-rate (SRN).

$$(SRP)/(SRN) = (N*(VIN-VREF)/L)/(N*(-VREF)/L) = (12-1)/1 = 11$$

In some applications, the positive voltage overshoot due to an off-loading event, where load current decreases, should be equal to the negative undershoot due to an equivalent loading event, where load current increases, in order for the output voltage not to drift away when the load current is stepping back and forth. As the result, a system may be limited by the off-loading output voltage overshoot due to the slow negative current slew rate of the inductor(s) and never takes advantage of the fast positive current slew-rate of the inductor(s). FIG. 4 illustrates this for a single-phase traditional buck converter going through a loading and off-loading event. In some applications, system gain may need to be reduced so that voltage undershoot on Vout matches the overshoot.

FIG. 5 shows an example of a single-phase regulator responding to a negative and then positive VREF voltage step. Due to the slow negative slew-rate, the output voltage takes a long time to slew down. Thus, the slow negative slew rate of the inductor current is again limiting how fast the output voltage can slew. As mentioned above, FIG. 5 illustrates an asymmetry that may be undesirable in some applications.

Fast slew rate switching regulators are advantageous in a variety of applications. For example, the development of microprocessors, following Moore's Law, has resulted in increasing on-chip power density, leading to thermal management challenges. CMOS processes have at least two components of power dissipation: 1) switching power, which is proportional to the square of the supply voltage and to clock frequency; and 2) device leakage power, which is a function of supply voltage.

Increasingly, micro-management of microprocessor supply voltage and clock frequency vis-à-vis its workload profile is used to gain significant power savings. Given that the main power dissipation mechanisms are strong functions of the supply voltage, significant power consumption reduction can be achieved with moderate reduction in the average supply voltage over time and usually with modest or no reduction in circuit performance.

Dynamic Voltage and Frequency Scaling (DVFS) techniques are used today at relatively low rates compared to the microprocessor rate of activity. The DVFS rate is currently limited by the voltage slew rate of available voltage regulators. The more closely the voltage regulator can track the microprocessor workload in real time, the more the time averaged supply voltage can be reduced, potentially resulting in significant power savings. Therefore, the full potential of existing DVFS techniques has been limited by voltage regulator technology.

For instance, some systems adjust the supply voltage and clock frequency at the Unix Kernel level with frequency being adjusted about every 10 us. Supply voltage is adjusted less frequently, due to the limitations of conventional regulators. This means that supply voltage is held unnecessarily at its peak while clock frequency is reduced. Therefore, the resulting average supply voltage, and associated average power dissipation, is higher than the theoretical average required by the workload.

Therefore, it would be advantageous to overcome the limitations of existing switching regulator technology.

SUMMARY

The present disclosure includes circuits and methods for switching regulators. In one embodiment, a first switching regulator stage receives a first input voltage and produces a first voltage on a first node. A second switching regulator stage receives the first input voltage and produces a second voltage on a second node. A capacitor includes a first terminal coupled to the first node and a second terminal coupled to the second node, and the first switching regulator stage and the second switching regulator stage are configured to set a first voltage on the first node and to set a second voltage on the second node.

The following detailed description and accompanying drawings provide a better understanding of the nature and advantages of the present disclosure.

DETAILED DESCRIPTION

The present disclosure pertains to switching regulator circuits and methods. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Embodiments of the present disclosure include switching regulator techniques (or switching voltage converter) with very high slew rates. In one example configuration, a first switching regulator stage may drive an output node and a second switching regulator stage may drive the same output node through a capacitor. The switching regulator stages may have multiple control loops to regulate voltage on terminals of the capacitor separating the outputs, for example. In one example embodiment, switching regulator stages are AC coupled together through a capacitor to provide high current slewing at high static efficiency, which in some example implementations may even be symmetrical. In one example embodiment, push-pull control of multiple switching stages is disclosed. Some embodiments may include multiple switching stages coupled to one terminal of a capacitor and multiple switching stages coupled to the other terminal of the capacitor. In some embodiments, multiple switching stages may drive terminals of multiple capacitors. Example embodiments may be used to change the power supply voltage of processors at very high slew rates without degrading static efficiency. Accordingly, power supply voltage may be modified to track the workload profile. Embodiments may also be advantageously used to respond quickly to current loading and off-loading events.

Figure 1:
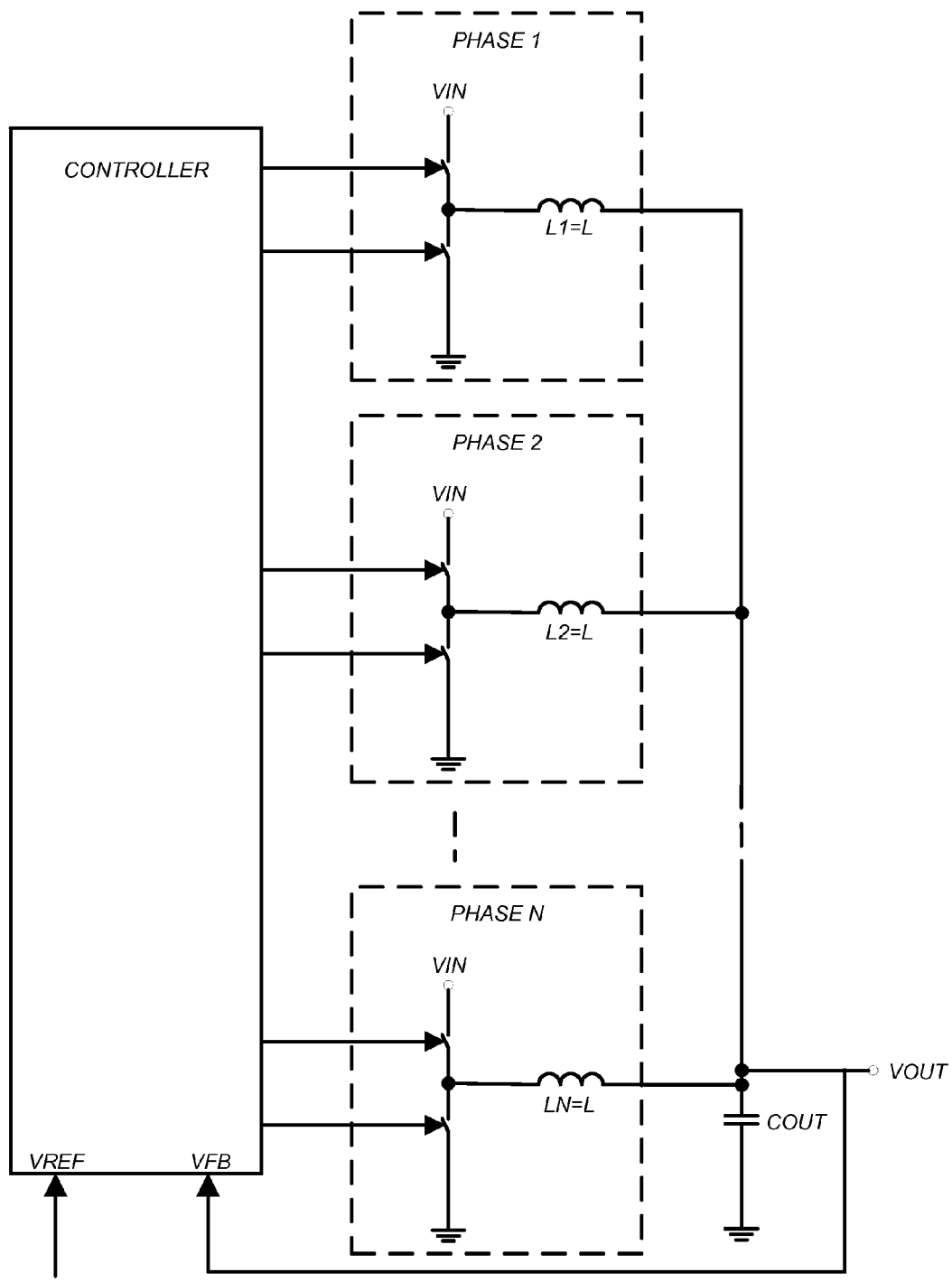
FIG. 1 illustrates a conventional multi-phase step-down switching regulator.
Figure 2:
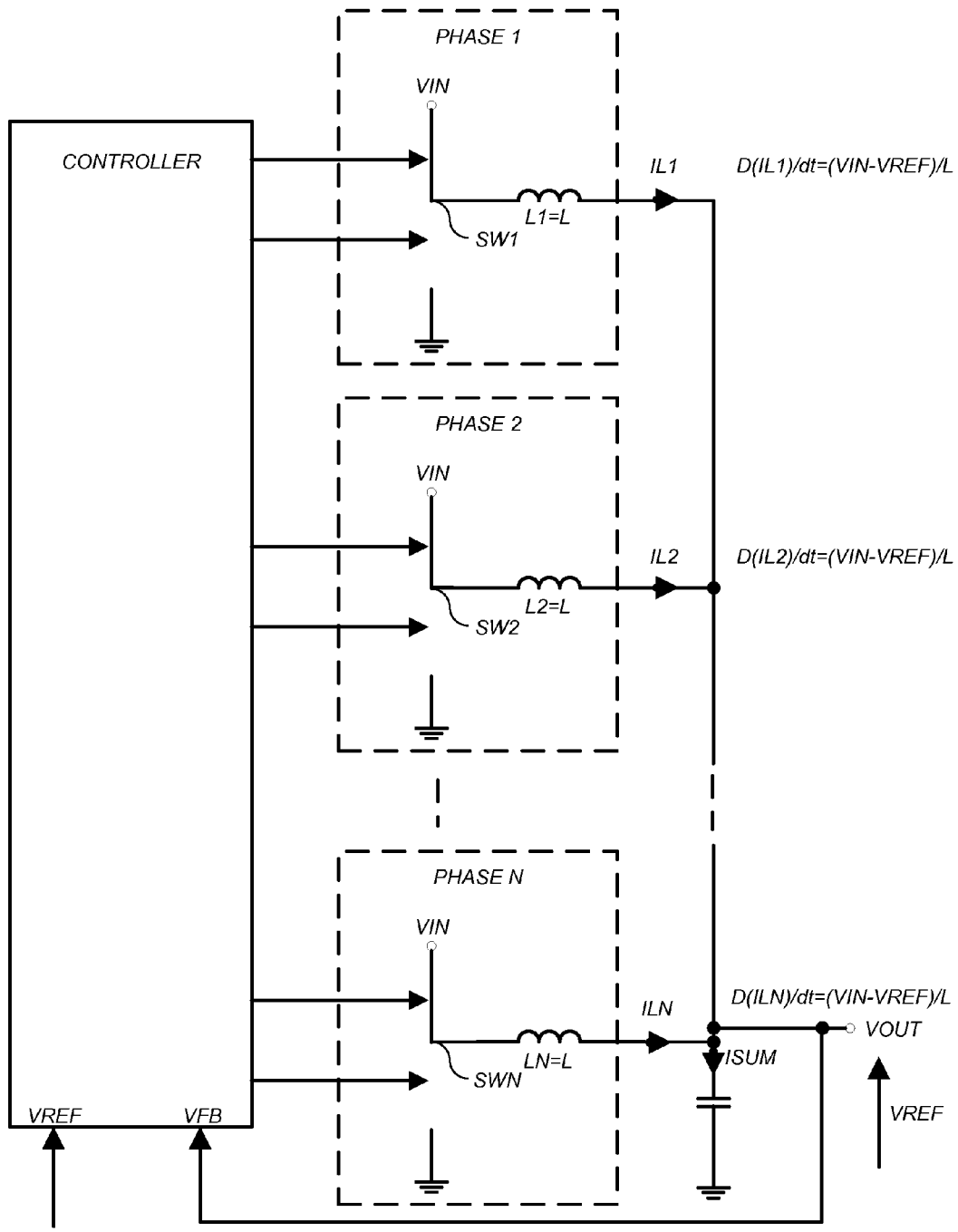
FIG. 2 illustrates the configuration of a conventional multi-phase step-down switching regulator during positive slew.
Figure 3:
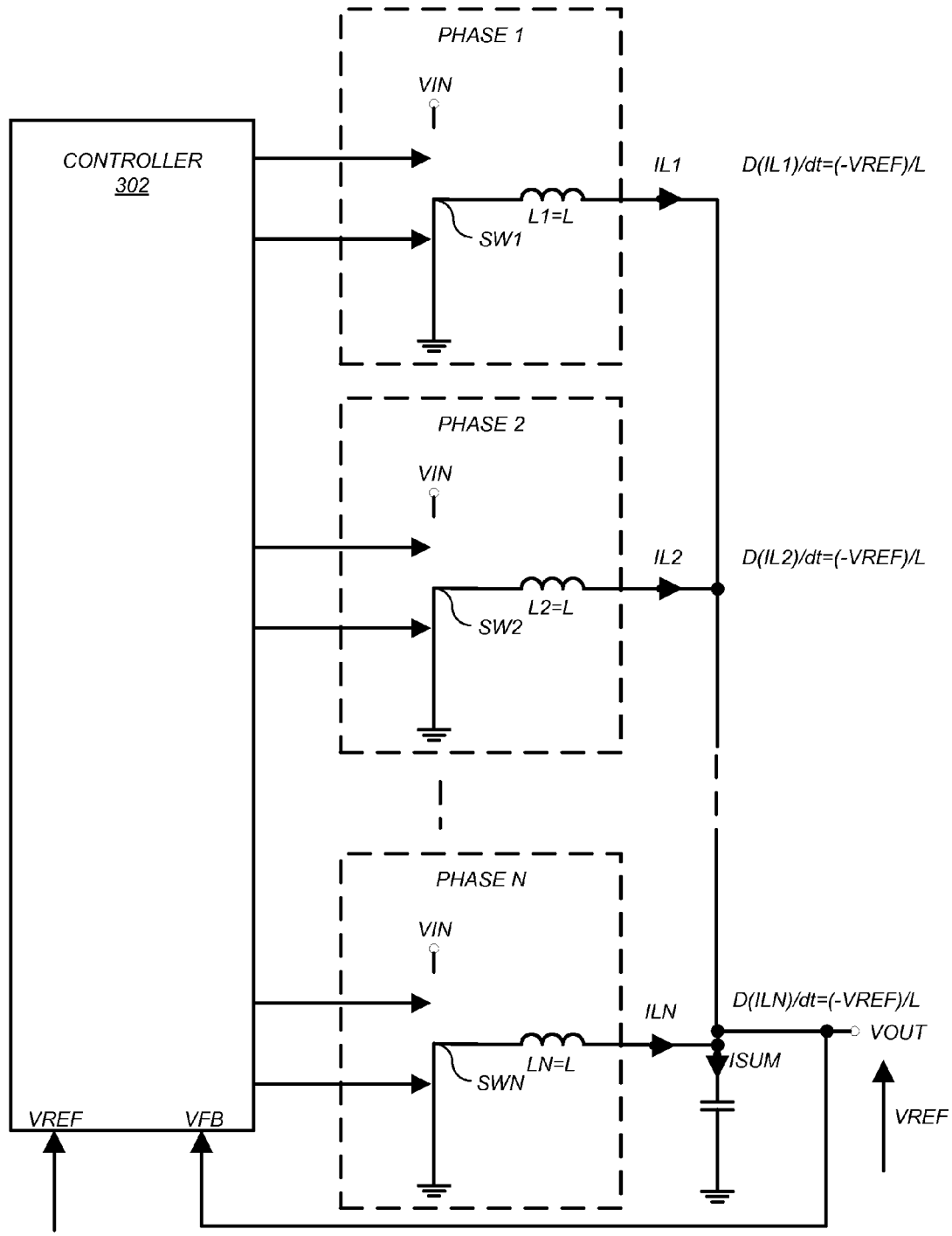
FIG. 3 illustrates the configuration of a conventional multi-phase step-down switching regulator during negative slew.
Figure 4:
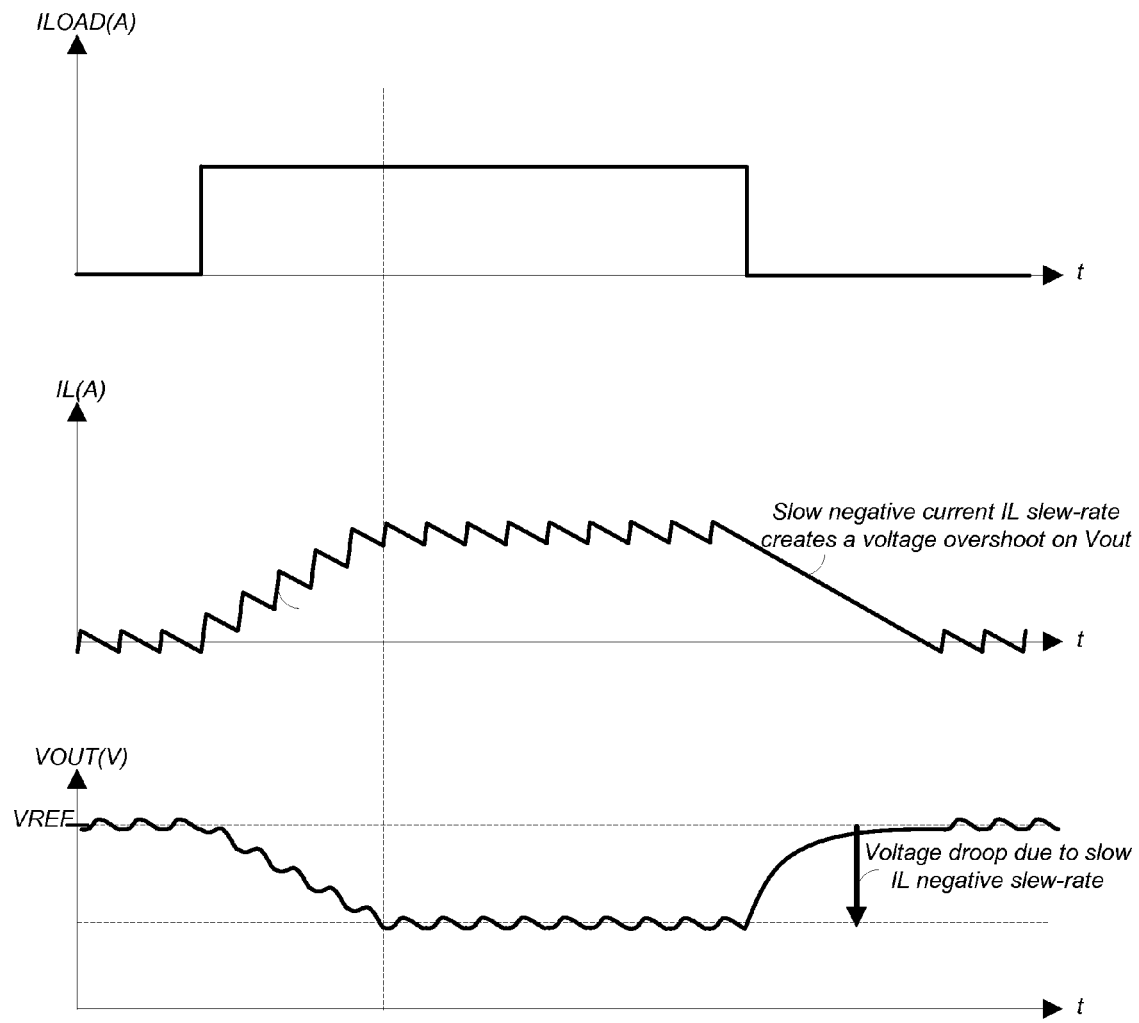
FIG. 4 illustrates a conventional single-phase traditional buck converter going through a loading and off-loading event.
Figure 5:
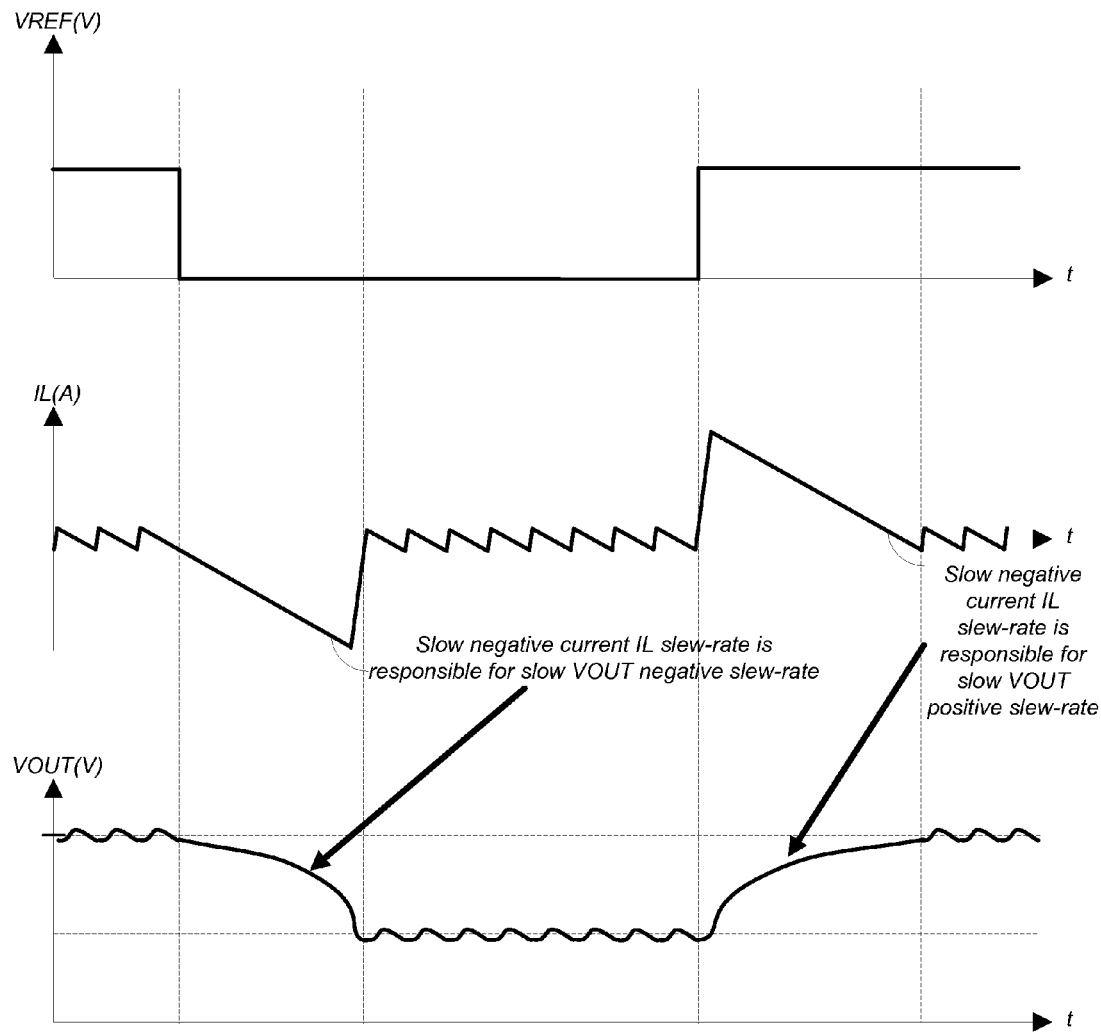
FIG. 5 illustrates a conventional single-phase regulator responding to a negative and then positive VREF voltage step.
Figure 6A:
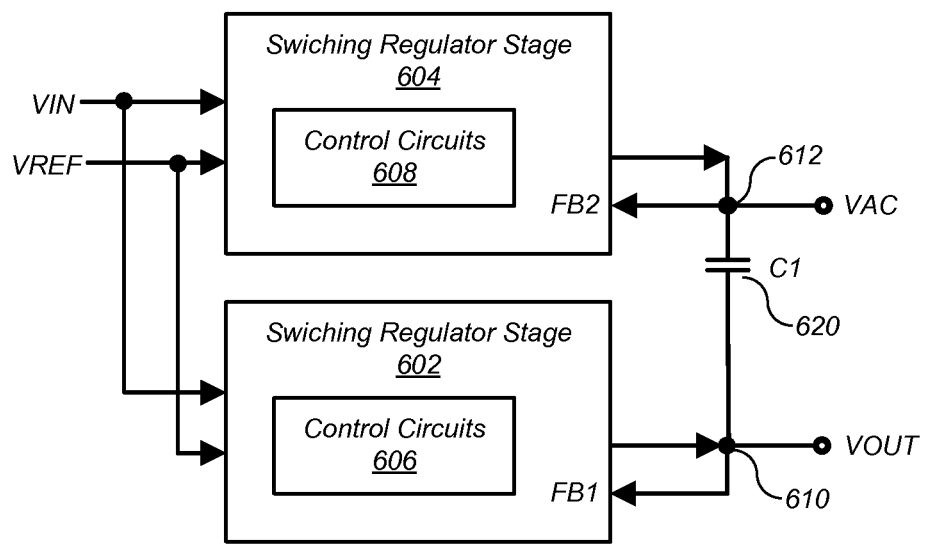
FIG. 6A illustrates an example switching regulator according to one embodiment.

FIG. 6A illustrates an example switching regulator according to one embodiment. In this example, a first switching regulator stage 602 is coupled to an output node 610 having a voltage VOUT. A second switching regulator stage 604 is coupled to a node 612 having a voltage VAC. Node 612 is coupled to node 610 by a capacitor (C1) 620. Embodiments of the present disclosure advantageously allow two switching regulator stages (also referred to as "phases") to operate under different conditions with different output voltages.

Switching regulator stages 602 and 604 are configured to regulate voltage VOUT on the node 610 and to regulate voltage VAC on node 612. In one embodiment, regulated voltage VOUT produced by switching regulator stage 602 is different than regulated voltage VAC produced by switching regulator stage 604, but switching regulator stage 604 may drive current (e.g., AC current) to the output of switching regulator stage 602 through capacitor 620 to advantageously improve the transient response of the circuit at node 610. In the present disclosure, the term switching regulator stage (or just "stage) and switching regulator phase (or just "phase") generally refers to an inductor, at least one switch (e.g., a transistor, such as an MOS transistor, for example) for selectively transferring input power stored in the inductor between circuit nodes, and may include control circuitry (such as drivers) for turning the switch(es) on and off to regulate an output parameter (e.g., voltage or current). Switching regulator stages are also typically coupled to output capacitors to store an output voltage, for example. In this illustrative diagram, the first switching regulator stage 602 may be coupled to the output node 610 through a first inductor (not shown), for example, and the second switching regulator stage 604 may be coupled to the output node 612 through a second inductor (not shown). Control circuitry may include circuits 606 and 608 for controlling switches in stages 602 and 604, respectively, to regulate VAC and VOUT.

Second switching regulator stage 604 is coupled to the output node 610 through a second inductor (not shown) and a capacitor, C1. Capacitor 620 has a first terminal coupled to output node 610 having a voltage VOUT. A second terminal of capacitor 620 is coupled to the second switching regulator stage 604 having a voltage VAC. Accordingly, in this example configuration, the output of the second switching regulator stage 604 having a voltage VAC at node 612 is AC coupled to output node 610 having a voltage VOUT.

In this example, both switching regulator stages 602 and 604 receive an input voltage, VIN, and a reference voltage, VREF. In other embodiments, one or more reference voltages may be generated internally as part of the circuitry. The first switching regulator stage 602 has a feedback input, FB1, coupled to a first terminal of capacitor 620 and the second switching regulator stage 604 has a second feedback input, FB2, coupled to the second terminal of capacitor 620. Feedback inputs FB1 and FB2 may be used to control a voltage VOUT on the output node 610 and to control a voltage VAC on the second terminal of the capacitor.

The first switching regulator stage 602 may include control circuits 606 to produce a first current through a first inductor to maintain VOUT at a particular voltage. The particular voltage may be set by VREF, for example, and a first control loop. The second switching regulator stage 604 may include control circuits 608 to produce a second current through the second inductor to maintain a voltage VAC at a particular voltage. VAC may be set by VREF and a second control loop, for example. In this example, because the second switching regulator stage 604 is AC coupled to the output node 610, the second switching regulator stage 604 may push and pull current to and from the output node 610, respectively, to improve the slew rate capability at the output node 610. Thus, both switching regulator stages 602 and 604 may push and pull current to and from the output node 610. In one embodiment, DC load current to node 610 is provided by the first switching regulator stage 602 (e.g., exclusively) and AC current is provided by the second switching regulator stage 604 to node 610 through capacitor 620 in response to a transient at node 610 (e.g., a change in load current or a change in the desired output voltage).

Features and advantages of some embodiments include AC coupled switching regulator stages that maintain different regulated output voltage. As mentioned above, switching regulator stage 602 may regulate a voltage VOUT on node 610 and switching regulator stage 604 may regulate a different voltage VAC on node 612. In one embodiment, the first switching regulator stage 602 operates at a first duty cycle and the second switching regulator stage 604 operates at a second duty cycle. Duty cycle of a step down (buck) switching regulator is as follows:

$$D = Vo/Vin,$$

where D is duty cycle, Vin is the input voltage, and Vo is the output voltage. Thus, for the circuit in FIG. 6, where VAC< >VOUT, the different duty cycles are as follows:

$$D1 = VOUT/VIN,$$

$$D2 = VAC/VIN,$$

and $$D1 < > D2,$$

where D1 is the duty cycle of switching regulator stage 602, D2 is the duty cycle of switching regulator stage 604, VOUT is the output voltage of switching regulator stage 602, VAC is the output voltage of switching regulator stage 604, and VIN is the input voltage to both stages. In one embodiment, VIN is greater than VAC, and VAC is greater than VOUT (e.g., both stages are step-down "buck" voltage converters). Accordingly, in some advantageous example implementations the duty cycle (D2) of the second switching regulator stage is greater than the duty cycle (D1) of the first switching regulator stage. For a buck switching regulator, the duty cycle sets the average output voltage. As a result the duty-cycle sets the positive inductance slew rate (i.e., Vin−Vout/L) together with the negative inductance slew rate (i.e., −Vout/L). Having the freedom to set the duty cycle of the AC phase advantageously allows selection of an optimum set of positive and negative current slew rates for the AC phase and to optimize the system for good regulation performance.

In one example embodiment described in more detail below, a first control loop maintains the voltage on the output node 610 at a first voltage, VOUT, and a second control loop maintains the voltage on node 612 between an inductor and capacitor, C1, at a second voltage, VAC, which may be a function of the input voltage VIN and/or the first voltage, VOUT. For instance, in one example implementation, VAC may be regulated at approximately one-half VIN (i.e., VAC=½ VIN). In another example described in more detail below, VAC is as follows:

$$VAC = VIN - VREF,$$

where $$VREF = VOUT.$$

Under the latter condition, the positive and negative current and voltage slew rates may be equal as described further below.

Figure 6B:
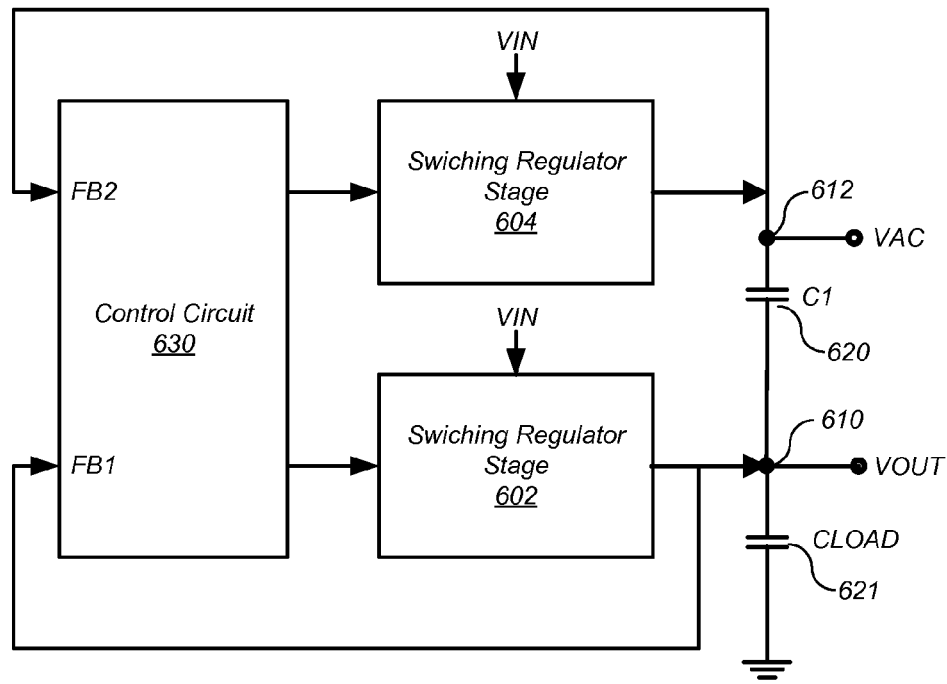
FIG. 6B illustrates an example switching regulator according to another embodiment.

FIG. 6B illustrates an example switching regulator configuration according to one embodiment. Switching regulator stage 602 receives an input voltage VIN and produces an output voltage VOUT on node 610. Switching regulator stage 604 receives an input voltage VIN and produces an output voltage VAC. In this example, VIN is the same voltage for both stages, but in some applications the stages may receive different input voltage levels to improve efficiency, for example. In this example, a control circuit 630 receives a feedback input from node 610 to sense voltage VOUT and another feedback input from node 612 to sense VAC. Control circuit 630 may include a first output coupled to switching regulator stage 602 and a second output coupled to switching regulator stage 604 to configure the stages 602 and 604 to produce regulated voltages VOUT and VAC. In one embodiment, control circuit 630 includes two internal voltage references (e.g., VREF_DC and VREF_AC) to regulate the voltages on stages 602 and 604. In one embodiment, reference voltage used to regulate VAC, VREF_AC, is generated based on at least the reference voltage used to regulate VOUT, VREF_DC, for example. In one embodiment, VREF_AC is greater than VREF_DC.

Figure 6C:
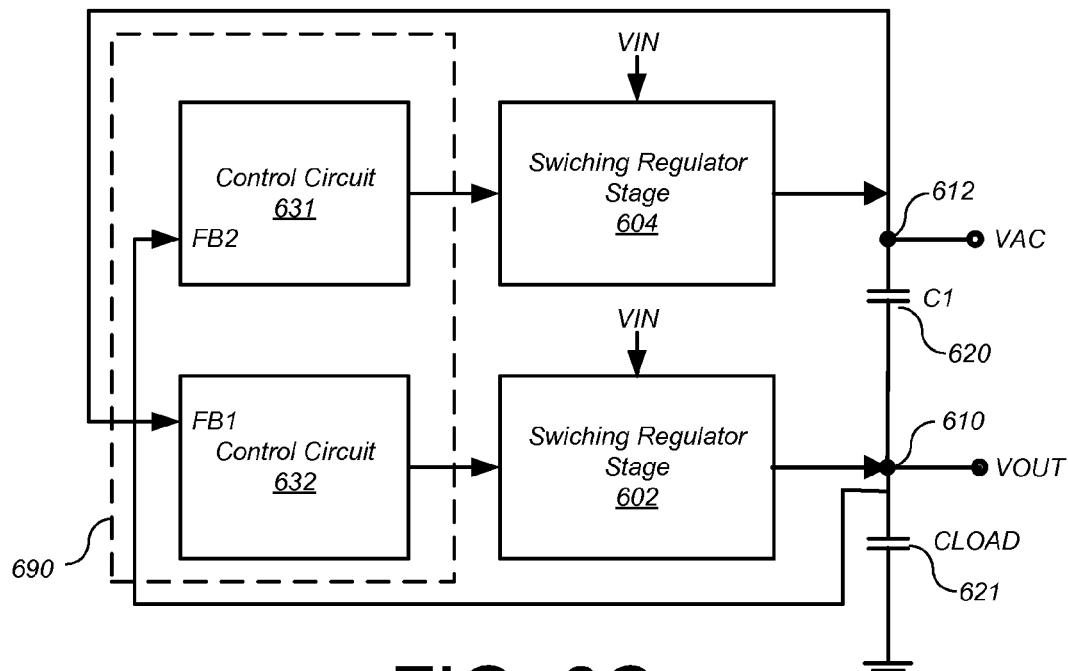
FIG. 6C illustrates an example switching regulator according to another embodiment.

FIG. 6C illustrates another example switching regulator configuration according to one embodiment. In this example, control circuit 690 includes a control circuit 631 having an input coupled to node 610 and an output coupled to switching regulator stage 604 to modify the operation of switching regulator stage 604. Further, control circuit 690 includes a control circuit 632 having an input coupled to node 612 and an output coupled to switching regulator stage 602 to modify the operation of switching regulator stage 602. In one embodiment, circuit 631 has a first bandwidth for responding to a transient on node 610 and circuit 632 has a second bandwidth for resetting a voltage on node 612, for example, and the first bandwidth is greater than the second bandwidth. In one embodiment, control circuit 632 may produce a current in node 610 to offset a corresponding current in node 610 from switching regulator stage 604 to reset voltage VAC on node 612.

Two example implementations of control circuits are provided below in FIG. 17 and FIG. 22 for illustrative purposes.

Figure 7:
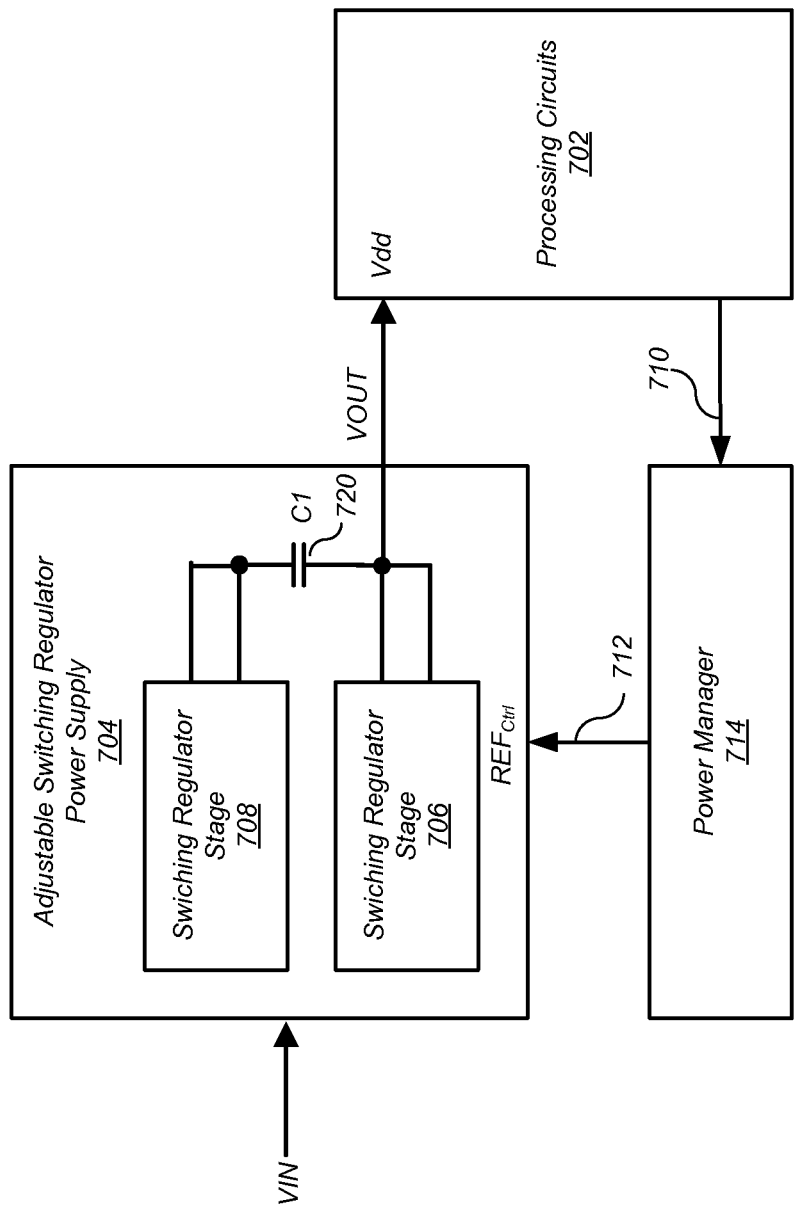
FIG. 7 illustrates an example application according to one particular embodiment.

FIG. 7 illustrates an example application according to one particular embodiment. In this example, processing circuits 702 (or "processor") receive a power supply voltage VOUT on a Vdd terminal. The power supply voltage VOUT is generated by an adjustable switching regulator power supply 704 comprising a first switching regulator stage 706 and a second switching regulator stage 708. To reduce power consumption, it may be desirable to change the power supply voltage VOUT used by the processing circuits 702 (e.g., based on the workload of the processor). In one example embodiment, power management circuit 714 (or "power manager") may monitor the state of the processing circuits 702 and may determine when the power supply voltage VOUT may be changed to reduce power consumption. The switching power supply 704 may receive a control signal 712 corresponding to a desired voltage output VOUT from power manager 714, for example. Accordingly, when conditions for changing the power supply voltage VOUT occur, such as when the processor workload increases, processing circuits 702 may send control signals 710 to the power manager 714 to change a reference voltage (e.g., VREF) used by switching regulator stages 706 and/or 708, for example, and in turn, change the voltage at VOUT. Example processing circuits 702 may include a number of different types of processors, such as one or more microprocessors, memories, systems on a chip, or other types of complex electronic circuits that consume different amounts of power during different time periods based on changing operational conditions, including but not limited to data processors such as CPUs, memories, graphics processors, network processors, and the like, for example. In some embodiments, a single processor may receive multiple different power supply voltages from multiple switching power supplies 704 to provide power to different power domains, and in each power domain the power supply voltage may be changed over time to reduce power consumption.

When the switching power supply 704 receives a signal 712 indicating a change in the output voltage VOUT is required (e.g., on the REFctrl input), an internal reference voltage for the switching power supply 704 may change to a new voltage. The switching power supply 704 may generate a first current from the first switching regulator stage 706 through a first inductor to the output, and may further generate a second current from the second switching regulator stage 708 through a second inductor and capacitor (C1) 720 to the output node. Based on the polarity of the currents, the voltage VOUT at the output of the switching power supply 704 (e.g., the voltage on the power supply terminal Vdd of the processing circuits) may be changed.

Figure 8:
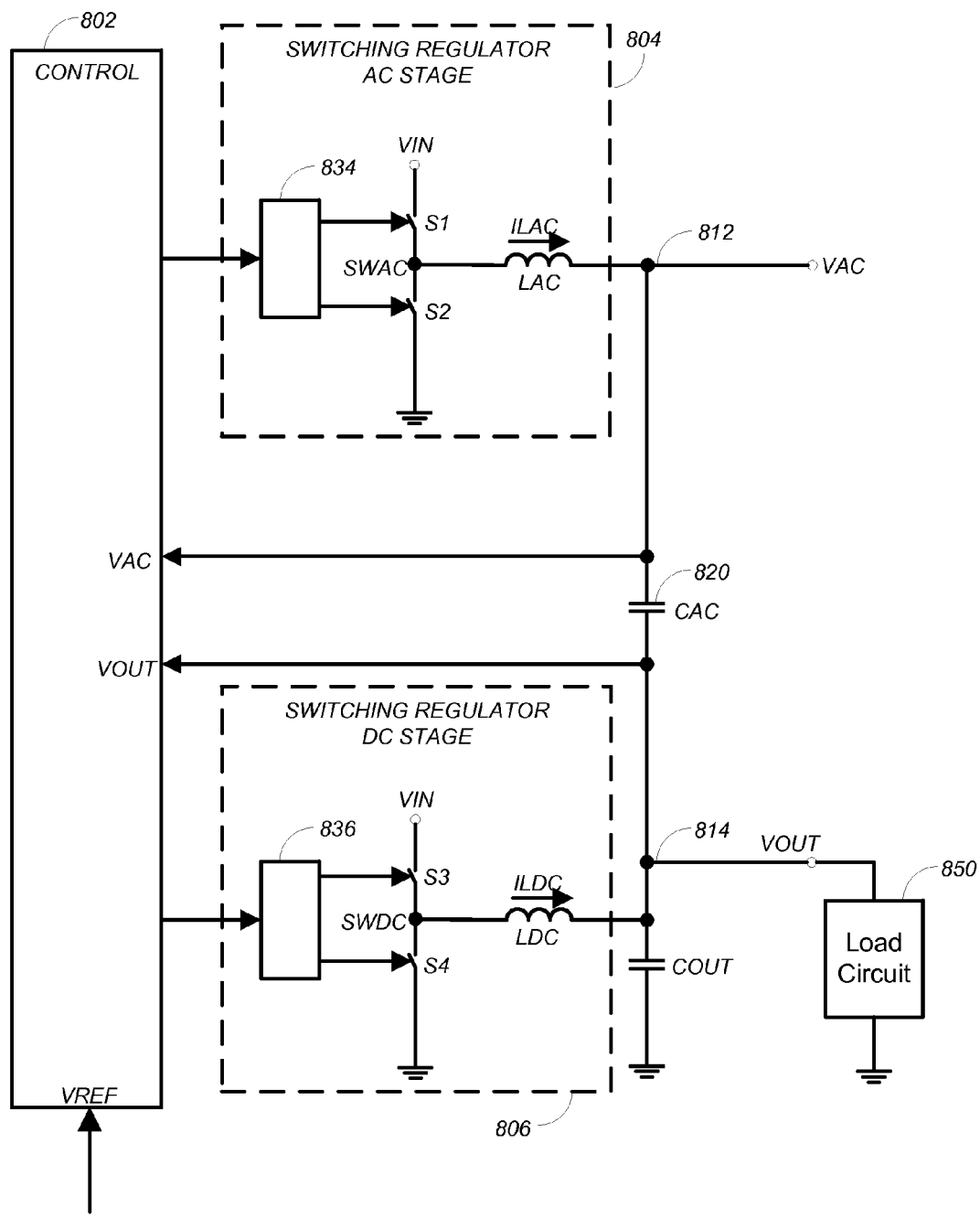
FIG. 8 illustrates an example according to another embodiment.

FIG. 8 illustrates another example according to one embodiment. This example includes a control circuit ("CONTROL") 802 and a network of inductors and capacitors arranged according to the topology shown. Control circuit 802 may include one or more reference voltages, such as VREF. In one example embodiment, VREF is controlled externally to change the output voltage VOUT, for example. In some embodiments, control circuit 802 may generate multiple different reference voltages (e.g., VREF DC and VREF AC) for regulating VOUT and VAC at different voltages. Control circuit 802 may include control circuits coupled to node 814 to receive voltage VOUT and to node 812 to receive voltage VAC to control the operation of the switching regulator stages. Example control circuits are described in more detail below.

From FIG. 8 it can be seen that a first switching regulator stage 806 receives an input voltage, VIN, and produces an output voltage, VOUT, on output node 814. In this example, VOUT is equal to reference voltage VREF, but in other embodiments VOUT may be related to VREF (e.g., linearly related to VREF via a resistor divider or gain stage in a control circuit). The first switching regulator stage 806, occasionally referred to herein as the "DC Stage", includes switches S3 and S4, an inductor LDC, and control circuitry for turning switches S3 and S4 on (switch short circuited or "closed") and off (switch open circuited or "open"). Switch S3 has a first terminal coupled to a node to receive input voltage VIN (e.g., from a power source). A second terminal of S3 is coupled to a switching node SWDC. Switch S4 has a first terminal coupled to switching node SWDC and a second terminal coupled to a node to receive a reference voltage (e.g., ground or another low side power supply voltage). A first inductor LDC has a first terminal coupled to switching node SWDC and a second terminal coupled to node 814.

A second switching regulator stage 804 receives the input voltage, VIN, and produces an output voltage, VAC, on output node 812. The second switching regulator stage 804, occasionally referred to herein as the "AC Stage", includes switches S1 and S2, an inductor LAC, and control circuitry for turning switches S1 and S2 on and off. Switch S1 has a first terminal coupled to a node to receive input voltage VIN. A second terminal of S1 is coupled to a switching node SWAC. Switch S2 has a first terminal coupled to switching node SWAC and a second terminal coupled to a node to receive ground. A second inductor LAC has a first terminal coupled to switching node SWAC and a second terminal coupled to node 812. Switches S1-S4 may be implemented using a variety of techniques, such as transistors (e.g., MOS transistors).

A capacitor CAC 820 is coupled between an output node 814 of the first switching regulator stage 806 having a first voltage VOUT and an output node 812 of the second switching regulator stage 804 having a second voltage VAC. Output node 814 may, in turn, be coupled an output capacitor COUT 821 and load circuit 850. As mentioned above, the switches in stages 804 and 806 are operated to regulate voltages VOUT and VAC. VOUT, in turn, may be used to provide voltage and current to a load circuit 850 across a range of load currents and/or voltages with fast slewing capability supplemented from stage 804 through the CAC capacitor.

Control circuit 802 includes a first feedback input, labeled VOUT, coupled to node 814 and a second feedback input, labeled VAC, coupled to node 812. Control circuit 802 may include a first output coupled to switch S3 and switch S4 through circuits 836 (e.g., drive circuits and other control circuits) to produce a regulated voltage, VOUT, on node 814. Similarly, control circuit 802 may include a second output coupled to switch S1 and switch S2 through circuits 834 (e.g., drive circuits and other control circuits) to produce a regulated voltage, VAC, on node 812. Accordingly, control circuit 802 and switching stages 804 and 806 regulate voltage VOUT on node 814 and regulate voltage VAC on node 812. In example embodiments described below, control circuit 802 may have multiple feedback paths and associated control circuits. For example, in one embodiment, control circuit 802 may include a first control circuit having an input coupled to node 814 and an output coupled to switching regulator stage 804 to modify the operation of switching regulator stage 804 and a second control circuit having an input coupled to node 812 and an output coupled to switching regulator stage 806 to modify the operation of switching regulator stage 806. In one example embodiment, control circuit 802 includes a first control circuit having a first bandwidth for responding to a transient on node 814 and a second control circuit having a second bandwidth for resetting a voltage on node 812, where the first bandwidth is greater than the second bandwidth. Control circuit 802 may further generate multiple different reference voltages for regulating VOUT and VAC as illustrated below.

Embodiments of the present disclosure include a switching converter able to take advantage of high step-down ratios. Particular embodiments may combine, under control of multiple closed loops, high positive inductor current slew rate in a DC phase (LDC) and high negative inductor current slew rate in an AC phase (LAC) to provide fast voltage regulation in response to either a reference voltage step or current load step. The DC phase features a high positive current slew-rate and a low negative current slew rate. The AC phase features the opposite (low positive current slew-rate and high negative current slew rate).

In many applications, such as DVFS as mentioned above, it may be desirable to transition voltages as quickly as possible (e.g., so that the actual workload profile of a processing circuit can be followed as closely as possible for maximum power savings). In some applications, it may also be desirable that slewing be symmetrical, or at least that the positive and negative edges have similar speeds. Some example embodiments may combine DC and AC-phase current to support a symmetrical current slew rate of ±(Vin/L), for example.

Features and advantages of some embodiments of the present disclosure include a positive output current slew-rate equal to the negative output current slew-rate. In addition to this symmetrical slew-rate property, some embodiments feature a push-pull and/or a pull-push current action able to greatly increase the voltage slew rate of the output node 814.

In one embodiment, symmetric current slew rate may be achieved through closed loop regulation of the VAC node 812 to a voltage equal to $$VAC=A\times VIN+B\times VOUT+C,$$

where A, B and C are system coefficients. Coefficients may be configured to a variety of values according to desired performance for a wide range of applications. For example, in one embodiment described in more detail below, the coefficients may be set at A=1, B=−1 and C=0 (i.e., VAC=VIN−VOUT) for symmetrical response performance. In another example embodiment, the coefficients may be set to A=½; B=C=0 (i.e., VAC=½ VIN). For the examples that follow, it will be assumed that A=1, B=−1 and C=0, but different values can also be used.

Figure 9:
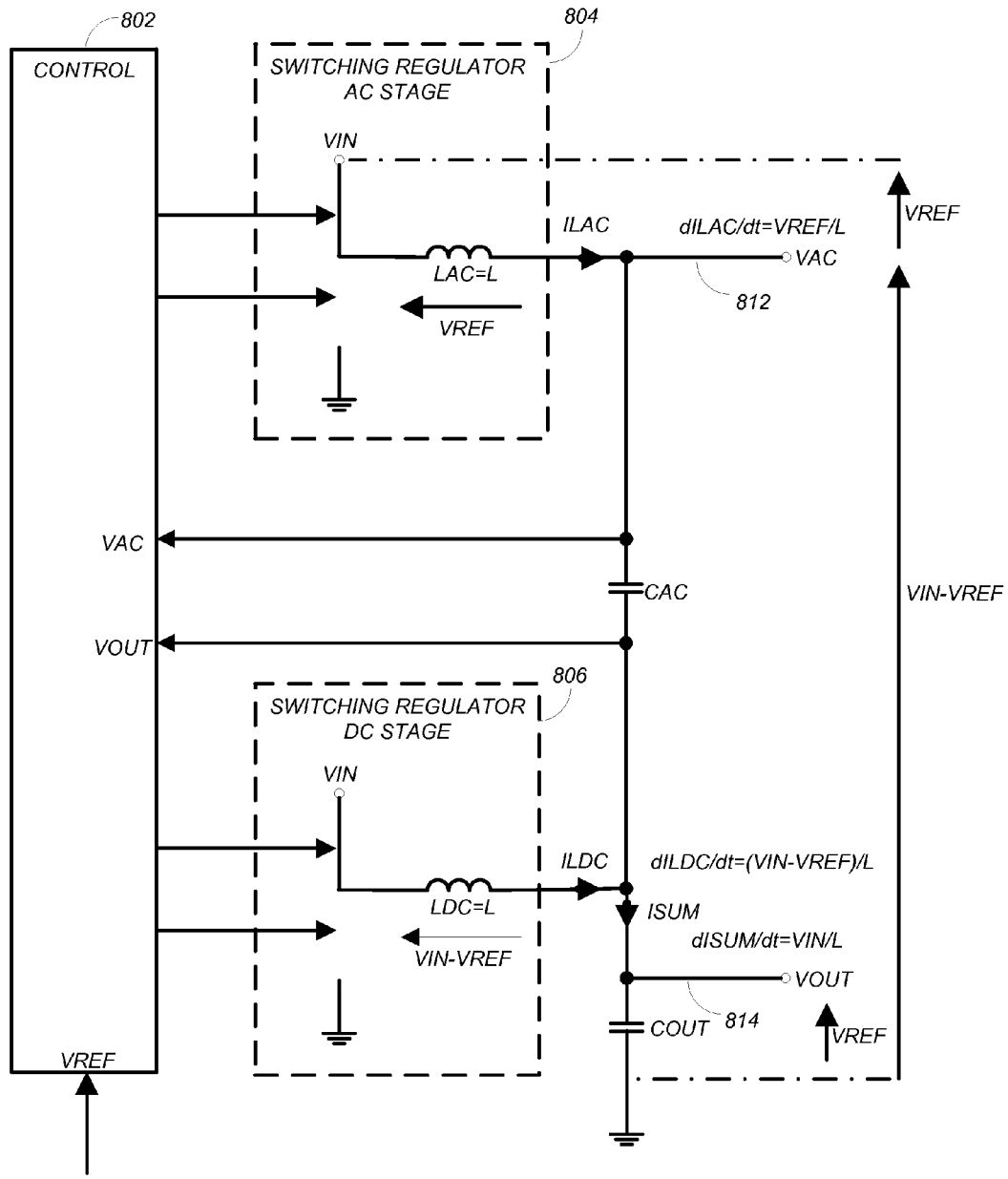
FIG. 9 illustrates positive current slewing according to one embodiment.
Figure 10:
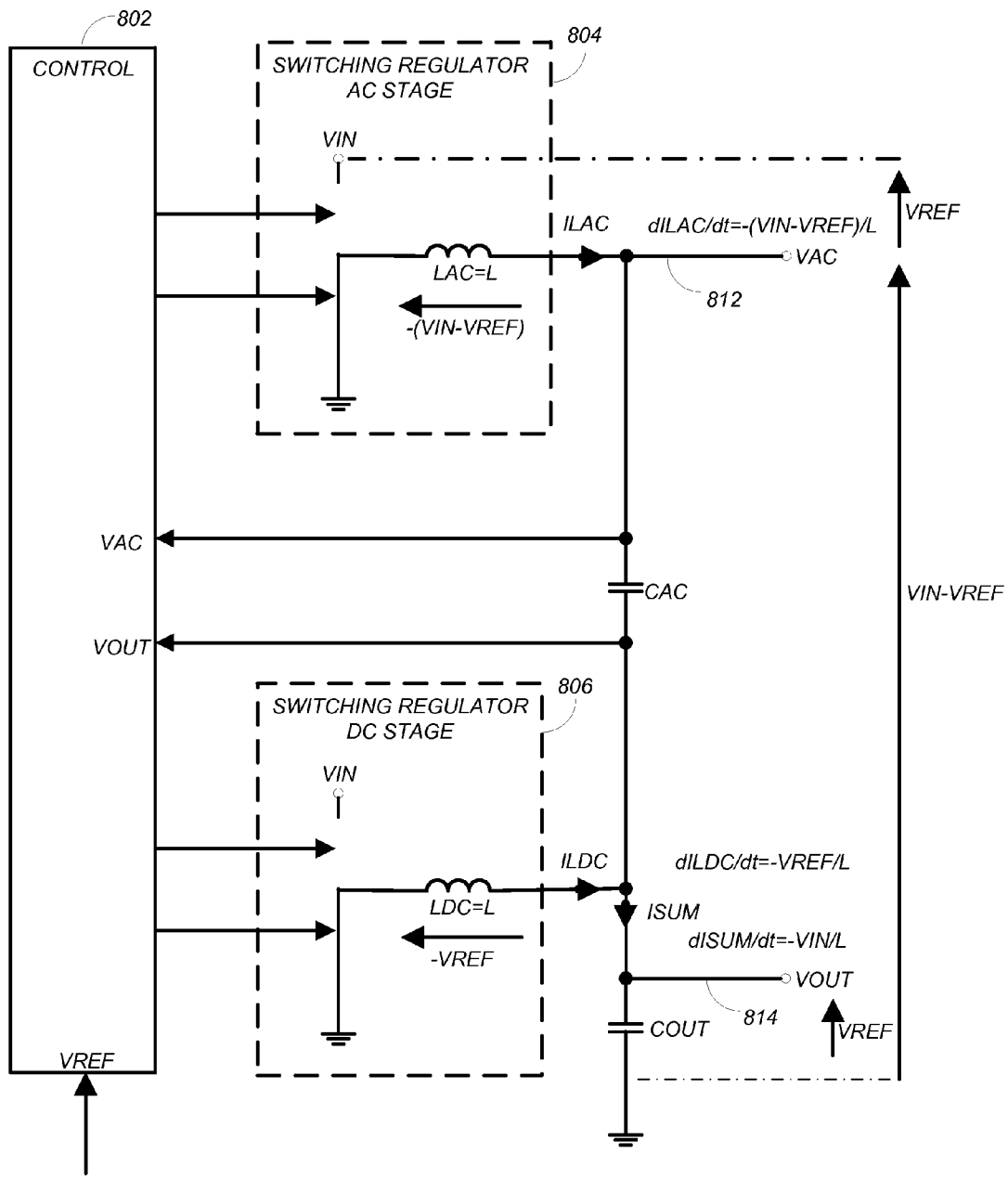
FIG. 10 illustrates negative current slewing according to one embodiment.

FIG. 9 illustrates one example configuration of the circuit in FIG. 8 for positive current slewing for the case of VAC=VIN−VOUT. FIG. 10 illustrates one example configuration of the circuit in FIG. 8 for negative current slewing for the case of VAC=VIN−VOUT. In these examples, the system takes advantage of the CAC capacitor to force a voltage on the VAC node 812 equal to VIN−VOUT. In FIGS. 9 and 10, it is assumed that VOUT=VREF, thus, VAC is set equal to VIN−VREF in the following description.

As illustrated in FIG. 9, the voltage across inductor LDC is a large positive voltage (VIN−VREF). Thus, the inductor current positive slew rate from LDC is:

$$(VIN-VREF)/L.$$

Similarly, the voltage across inductor LAC is VIN−(VIN−VREF). Thus, the inductor current positive slew rate from LAC is:

$$VREF/L.$$

Thus, for positive slewing, the LDC inductor has a much larger voltage and corresponding slew rate than the LAC inductor. However, the sum of the two inductors currents slews up at:

$$VREF/L+(VIN-VREF)/L=VIN/L.$$

FIG. 10 shows the circuit configuration for negative current slewing. As illustrated in FIG. 10, the voltage across inductor LAC is a large negative voltage (−(VIN−VREF)). Thus, the inductor negative current slew rate from LAC is:

$$-(VIN-VREF)/L.$$

Similarly, the voltage across inductor LDC is (−VREF). Thus, the inductor current negative slew rate from LAC is:

$$-(VREF/L).$$

Thus, for negative slewing, the LAC inductor has a much larger voltage and corresponding slew rate than the LDC inductor. However, the sum of the two inductors currents slews down at:

$$(-VREF/L)+(-(VIN-VREF)/L)=-VIN/L.$$

Accordingly, under these conditions, the sum of the inductor current slew rates for a positive slew is equal in magnitude to the sum of the inductor current slew rates for a negative slew.

FIGS. 9 and 10 demonstrate the symmetric slewing at node 814 can be achieved by applying equal but opposite voltages across the AC coupled LDC and LAC inductors during different switching phases. For example, a voltage (VIN−VREF) across the LDC inductor in a first switching phase (e.g., when S1 and S3 are closed) is approximately equal to a voltage (VIN−VREF) across the LAC inductor in a second switching phase (e.g., when S2 and S4 are closed). Similarly, a voltage (−VREF) across the LDC inductor in the second switching phase (S2/S4 closed) is approximately equal to a voltage (−VREF) across the LAC inductor in the first switching phase (S1/S3 closed). Thus, the sum of the inductor currents during the two phases is the same.

As shown in FIG. 9, regulation of the VAC node 812 voltage at (VIN−VREF) allows cancellation of the VREF term at the output, and the resulting combined current slew rate is based on VIN. Similarly, as shown in FIG. 10, the large negative voltage −(VIN−VREF) applied across the LAC terminal is generated by grounding one of the terminals of LAC and connecting the other to the VAC node 812. Regulation of the VAC node 812 voltage at (VIN−VREF) in closed loop again results in cancellation of the VREF term resulting in a combined slew rate based on VIN. Accordingly, in this example, the positive and negative slew rates are independent of the output voltage VOUT. For this example implementation, if VAC is not regulated, random deviations of VAC from (VIN−VREF) may degrade VOUT regulation and impact performance.

Figure 11:
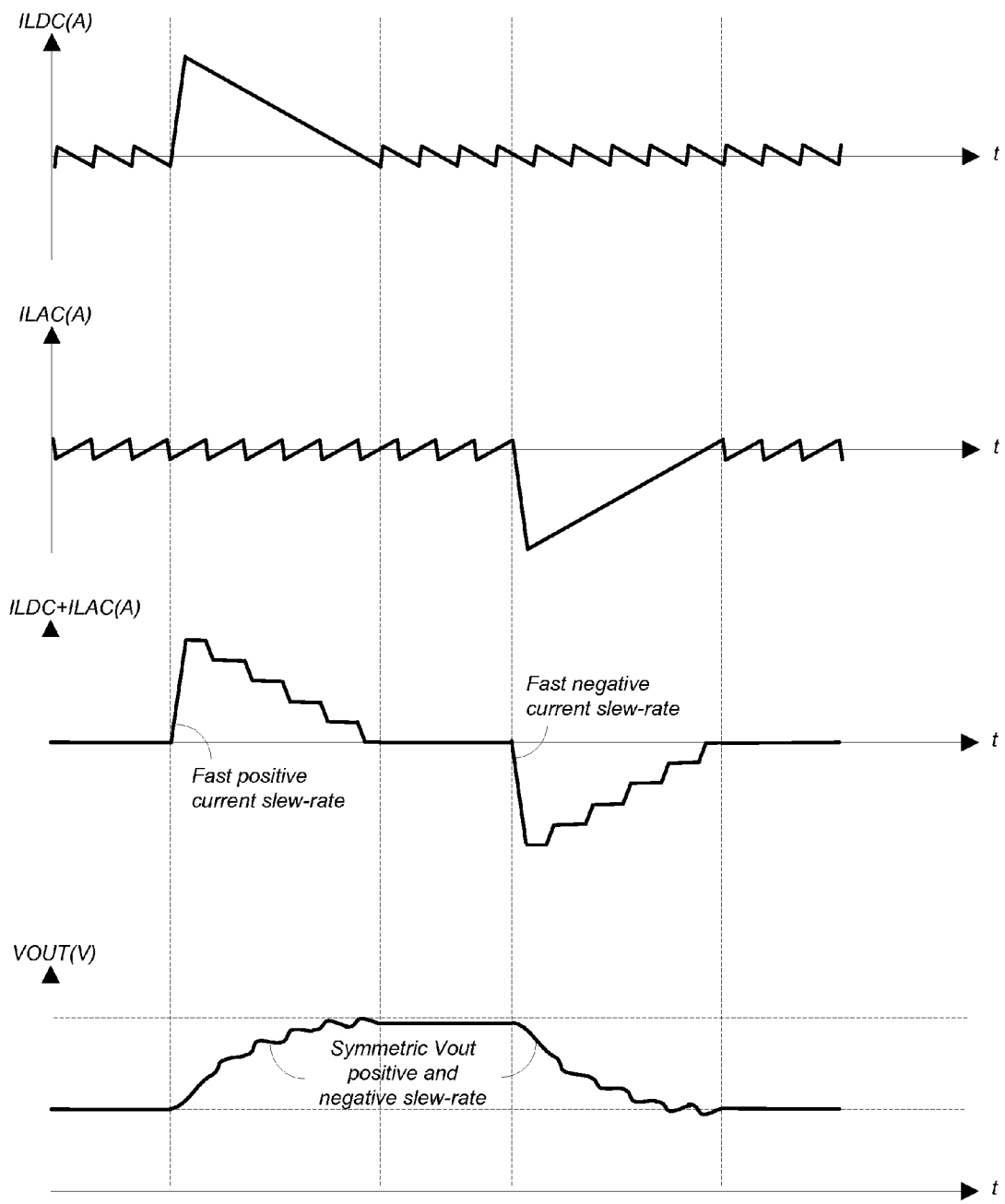
FIG. 11 shows current and voltage waveforms according to one example operation.

FIG. 11 shows current and voltage waveforms for the circuit in FIGS. 8-10 according to one example operation. The waveforms show how the system may respond to a voltage reference (VREF) step up followed by step down. Note that the step down response features an initial negative slew rate faster than a conventional buck step-down switching regulator (the current is ramping down faster) and the overall response is symmetric.

In this example, in steady state, the loop independently controls the instantaneous duty cycle of each of the LDC and LAC inductors. Having independent control of the LDC and LAC inductor duty-cycles in steady state may ensure active regulation of the VAC node 812 voltage at a desired voltage level (e.g., VIN−VREF), in anticipation of the next load step.

Figure 12:
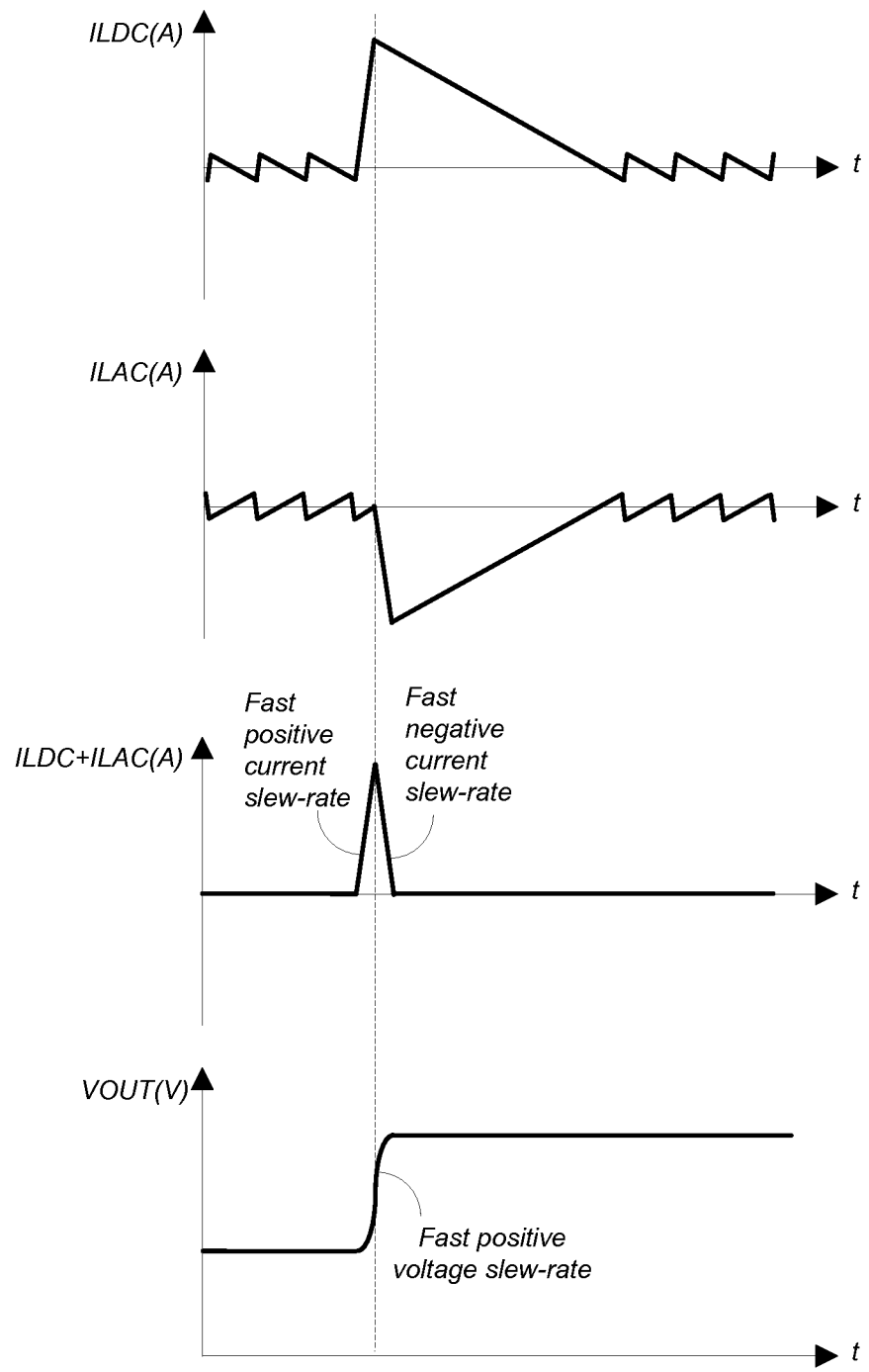
FIG. 12 illustrates push-pull operation according to one embodiment.

In one example embodiment, the circuit of FIGS. 8-10 may be operated to perform push-pull and/or pull-push actions to improve system response. From FIG. 11 it can be seen that the LDC inductor current ILDC ramps up quickly, but ramps down slowly. Conversely, the LAC inductor current ILAC ramps down quickly, but ramps up slowly. Combining a quick ramp up of the LDC inductor current ILDC followed by a quick ramp down of the LAC inductor current ILAC (referred to as "push-pull" action) allows the system to ramp the sum of the inductors currents ILDC+ILAC that feed the output node 814 up and down quickly to produce a positive voltage step at the output. FIG. 12 illustrates push-pull operation of the circuit of FIGS. 8-10. The CONTROL circuit 802 first initiates a push operation, which configures both switching regulators 804, 806 to increase current into the output node 814. Next, the CONTROL circuit 802 initiates a pull operation, which configures both switching regulators 804, 806 to reduce current into the output node 814. By configuring the LAC inductor current ILAC to slew down quickly, the system has the ability to cancel, at the output node 814, the positive current previously built in the LDC inductor.

Figure 13:
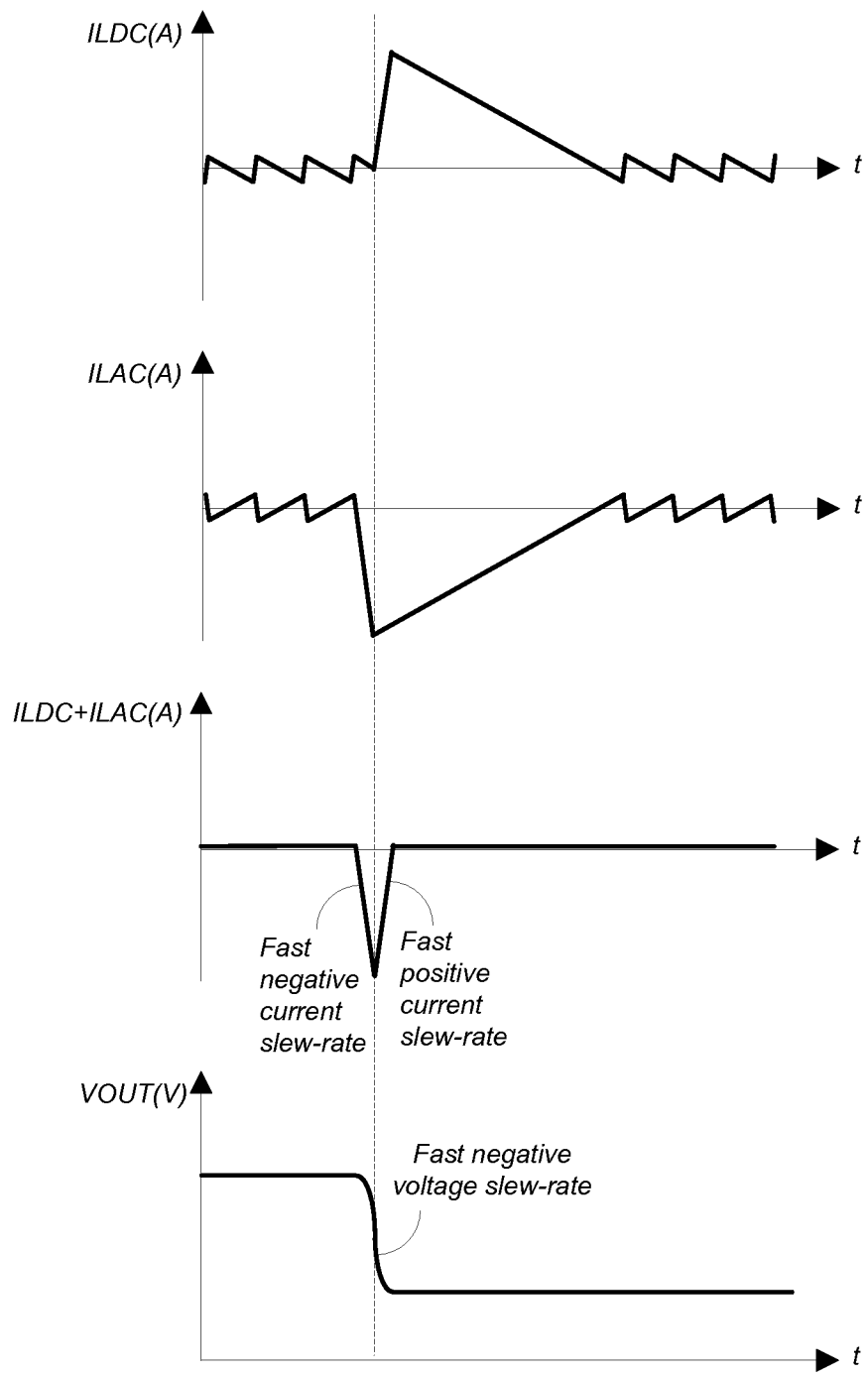
FIG. 13 illustrates pull-push operation according to one embodiment.

Conversely, combining a quick ramp down of the LAC inductor current ILAC followed by a quick ramp up of the LDC inductor current ILDC (referred to as "pull-push" action) allows the system to ramp the sum of the inductors currents ILDC+ILAC that feed the output node 814 down and up quickly to produce a negative voltage step at the output node 814. FIG. 13 illustrates pull-push operation of the circuit of FIGS. 8-10. The CONTROL circuit 802 first initiates a pull operation, which configures both switching regulators 804, 806 to decrease current into the output node 814. Next, the CONTROL circuit initiates a push operation, which configures both switching regulators 804, 806 to increase current into the output node 814. By configuring the LDC inductor current ILDC to slew up quickly, the system has the ability to cancel, at the output node 814, the negative current previously built in the LAC inductor.

A push-pull operation may be performed in response to a loading event or a positive voltage step on the reference voltage (VREF). The push-pull action may be performed in 3 steps. First, the CONTROL circuit 802 forces the sum of the inductors currents ILAC+ILDC to slew up quickly by commanding the switches S1 and S3 to short the SWAC and SWDC nodes to VIN. Then, after a time delay, the CONTROL circuit 802 forces the sum of the LAC and LDC inductor currents ILAC+ILDC to slew down quickly by commanding the switches S2 and S4 to short the SWAC and SWDC nodes to ground. Finally, once the sum of the LDC and LAC currents ILAC+ILDC has returned to the load current (e.g., set at 0 in FIG. 12) the CONTROL circuit 802 may drive the switches to bring the LAC current ILAC back to 0 as fast as possible while maintaining the sum of the inductor currents ILAC+ILDC equal to the load current.

Conversely, in response to a off-loading event or a negative voltage step on the reference voltage (VREF) the pull-push action is done in 3 steps. First, the CONTROL circuit 802 forces the sum of the LAC and LDC inductor currents ILAC+ILDC to slew down quickly by commanding the switches S2 and S4 to short the SWAC and SWDC nodes to ground. Then, after a possible time delay, the CONTROL circuit 802 forces the sum of the LAC and LDC inductor currents ILAC+ILDC to slew up quickly by commanding the switches S1 and S3 to short the SWAC and SADC nodes to VIN. Finally, once the sum of the LDC and LAC inductor currents LAC and LDC has returned to the load current (e.g., set at 0 in FIG. 13) the CONTROL circuit 802 drives the switches to bring the LAC current ILAC back to 0 as fast as possible while maintaining the sum of the inductors currents ILAC+ILDC equal to the load current.

Figure 14:
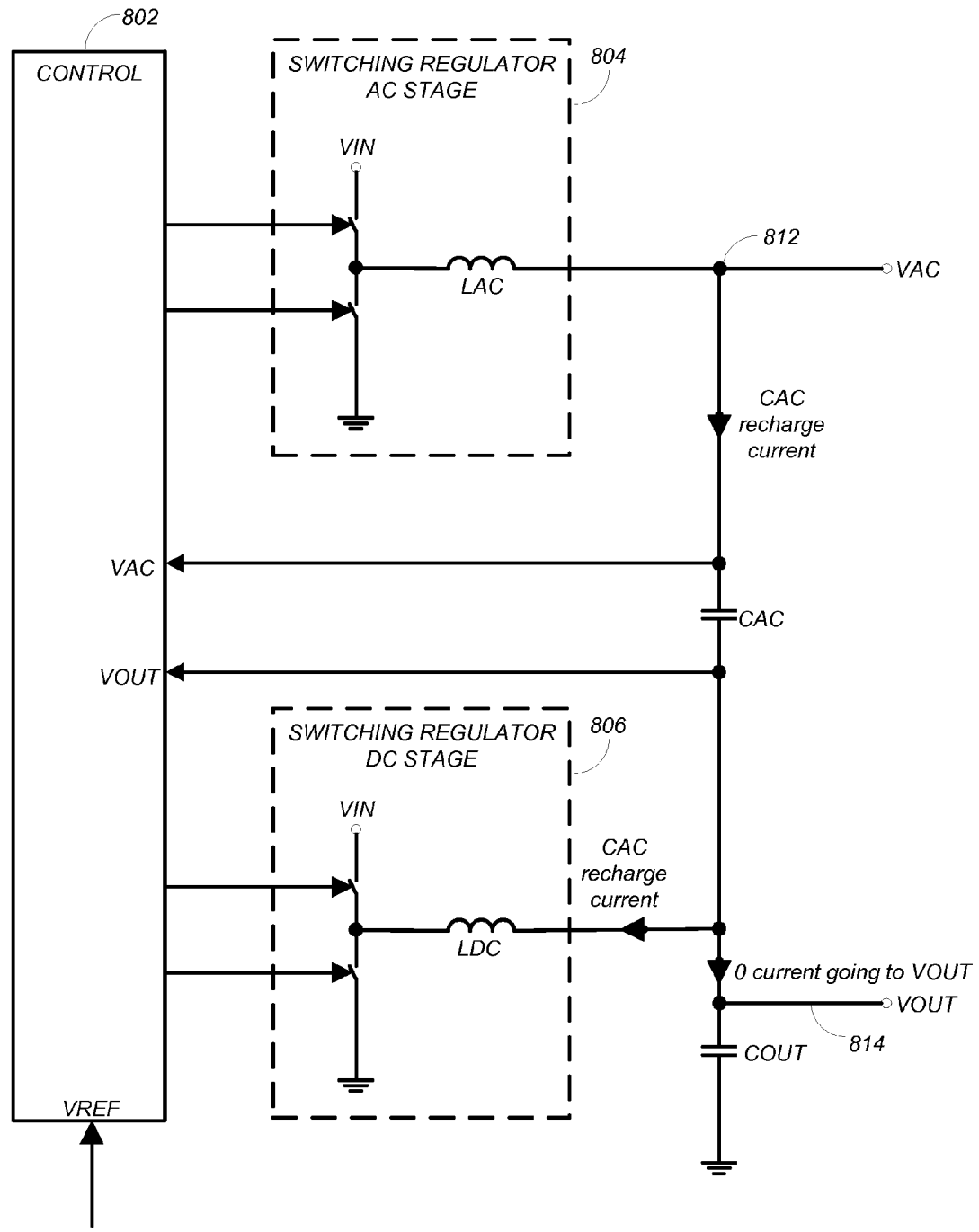
FIG. 14 illustrates a recharge action according to another example embodiment.

FIG. 14 illustrates a recharge action according to another example embodiment. Transient activity at the output VOUT of the circuit shown in FIGS. 6 and 8 may cause deviations in the VAC voltage. Accordingly, embodiments of the present disclosure may include techniques for resetting the voltage on VAC without impacting a load coupled to VOUT, for example. For instance, in response to a transient at output 814, switching regulator stage 804 may generate a current (e.g., positive or negative polarity) to node 814 through the CAC capacitor during a first time period, which produces a change in the VAC voltage on the CAC capacitor at node 812. Thereafter, switching regulator stage 804 may generate a CAC recharge current (e.g., of opposite polarity) during a second time period following the first time period to reset the voltage on the capacitor to VAC. The extra CAC recharge current from stage 804 through the CAC capacitor and into node 814 may be accounted for by a corresponding change in current from stage 806 so the load current is unaffected. For example, switching regulator stage 806 may generate a current to the first node comprising at least a CAC recharge current component having an approximately equal magnitude and opposite polarity to the CAC recharge current from stage 804 during the same time period. As illustrated by the example below, in one embodiment the current generated by switching regulator stage 804 in response to the transient may have a slew rate much greater than the slew rate of the CAC recharge current, for example, due to the voltages across the LAC inductor during the different switching phases. In one example embodiment, a control circuit may have an input coupled to node 812 via feedback input VAC to receive voltage VAC. An output of the control circuit may be coupled to switching regulator stage 806 to produce a current component in node 814 to offset a corresponding current in node 814 from switching regulator stage 804 to reset voltage VAC on node 812.

CAC recharge may be further understood by reference to the following example in a symmetric push-pull or pull-push configuration. A push-pull or a pull-push action will discharge the CAC capacitor and cause the VAC node 812 voltage to deviate from a set value (e.g., VIN−REF). In order to recharge the CAC capacitor as fast as possible (e.g., in preparation for the next transient) the CONTROL circuit 802 may configure the DC Stage 806 to sink, from the VOUT node 814, an equal current as is sourced to the VAC node 812 by the AC Stage 804. In this way, disturbance on VOUT may be minimized. As illustrated in FIG. 14, the CONTROL circuit 802 may configure the AC Stage 804 to generate a positive CAC recharge current into the top terminal of the CAC capacitor. In order to produce a net zero total output current into the output capacitor, COUT, the CONTROL circuit 802 may also simultaneously configure the DC Stage 806 to generate a negative CAC recharge current out of the bottom terminal of the CAC capacitor.

Figure 15:
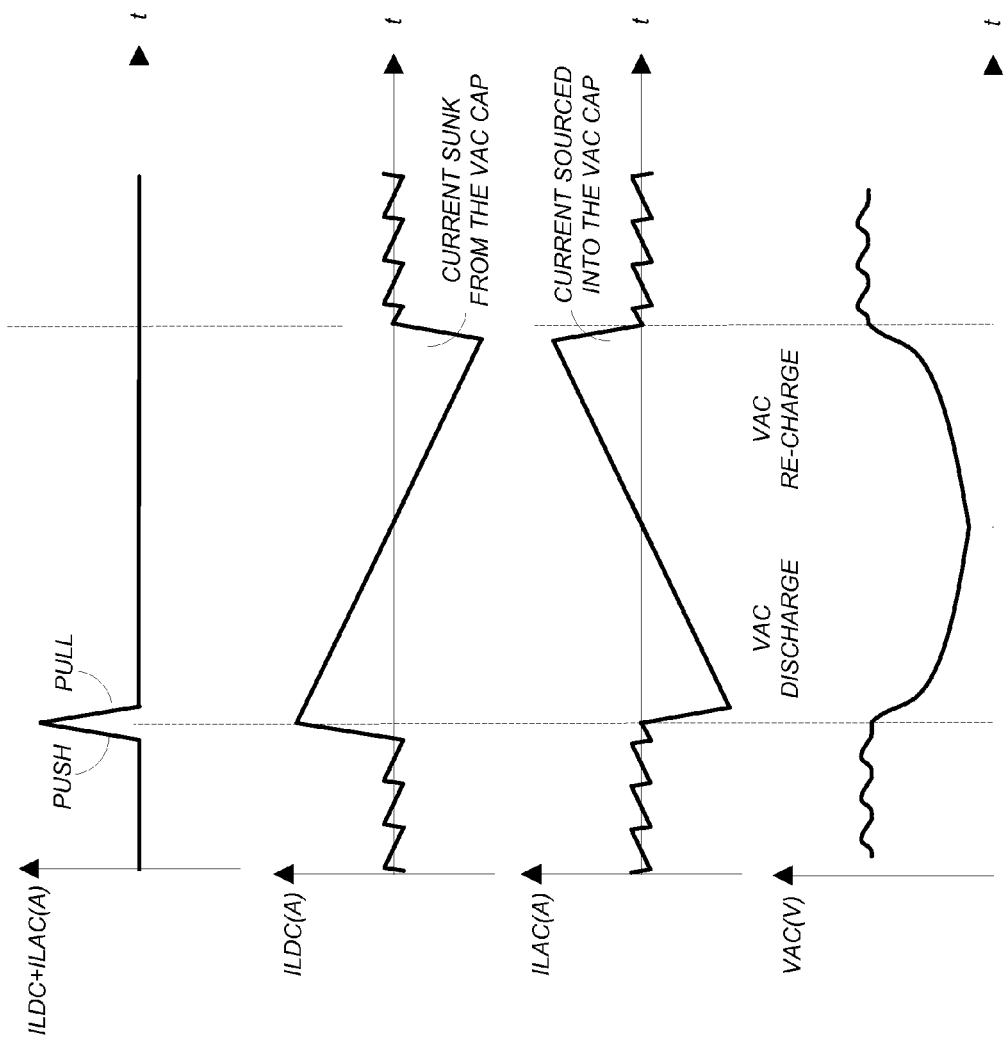
FIGS. 15-16 illustrate push-pull, pull-push, and recharge waveforms for one example embodiment.
Figure 16:
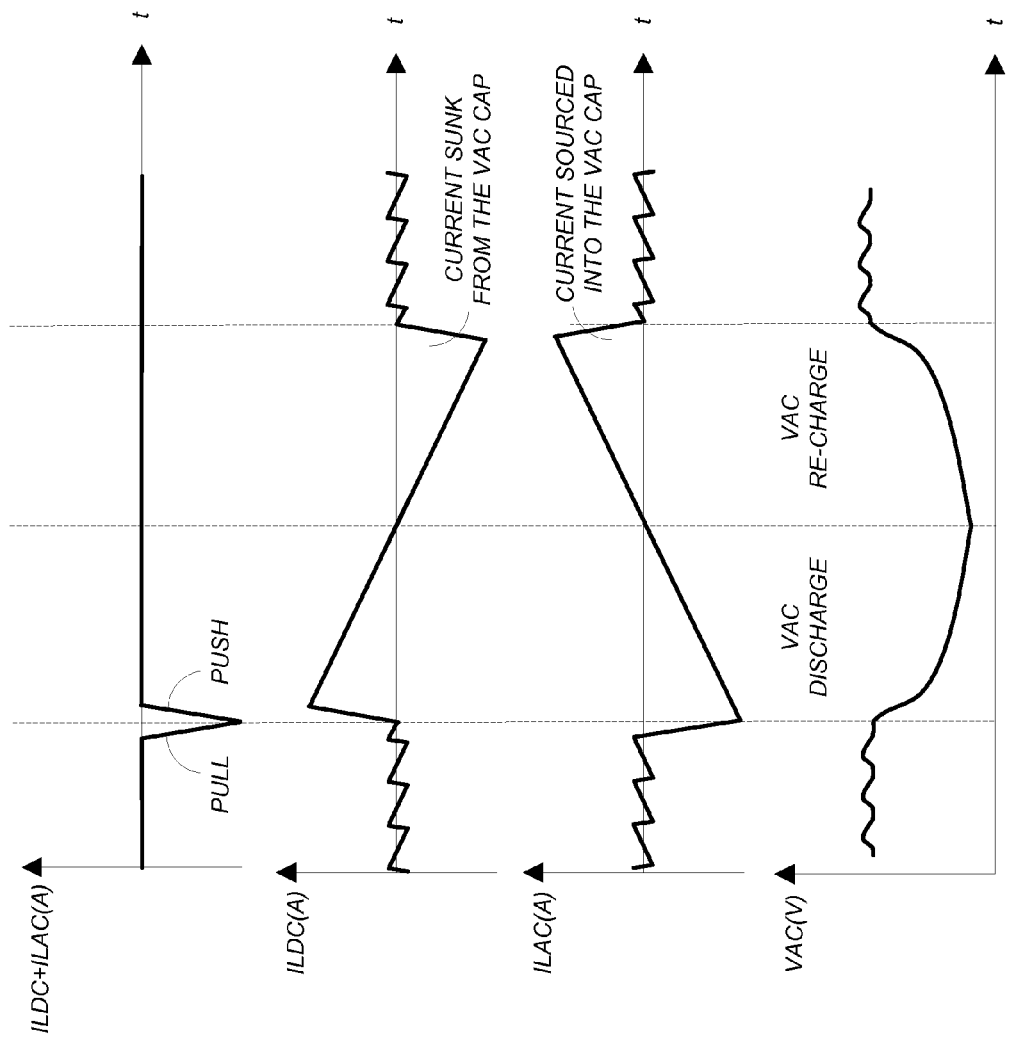

FIGS. 15-16 illustrate push-pull, pull-push, and recharge waveforms for one example implementation. As shown in FIGS. 15-16 when a load transient or output voltage step event occurs and a push-pull or pull-push action is performed, the VAC voltage moves away from the desired VIN−VREF voltage. This is illustrated in FIGS. 15-16 as VAC dropping below its nominal value of VIN−VREF. It may be desirable in some applications for the system to recover as fast as possible from a previous transient by quickly bringing the VAC node 812 voltage back to its VIN−VREF value in preparation for the next transient.

The recharge of the VAC node 812 may be done without disturbing the regulation of the output voltage (VOUT). To accomplish this, a current may be sourced into the VAC node 812 by the LAC inductor while the same current with the opposite polarity may be sunk from the VOUT node 814 by the LDC inductor. Both the sourced current (from the LAC inductor) and the sunk current (from the LDC inductor) cancel each other at the VOUT output node 814. Therefore, the VOUT node 814 voltage is not affected by the slewing of the voltage across the CAC capacitor. The recharge phase of the process is illustrated in FIGS. 15-16 as the point where inductor currents ILDC and ILAC cross their nominal values after the push-pull/pull-push pulses. Rather than returning to steady state operation, the CONTROL circuit 802 configures the AC Stage 804 to cause the LAC inductor current ILAC to continue to increase and the CONTROL circuit 802 configures the DC Stage 806 to cause the LDC inductor current ILDC to continue to decrease. The recharge action is complete at the point where the voltage across the CAC capacitor is such that the VAC node 812 voltage has returned to its nominal value. The system then returns to steady state.

Figure 17:
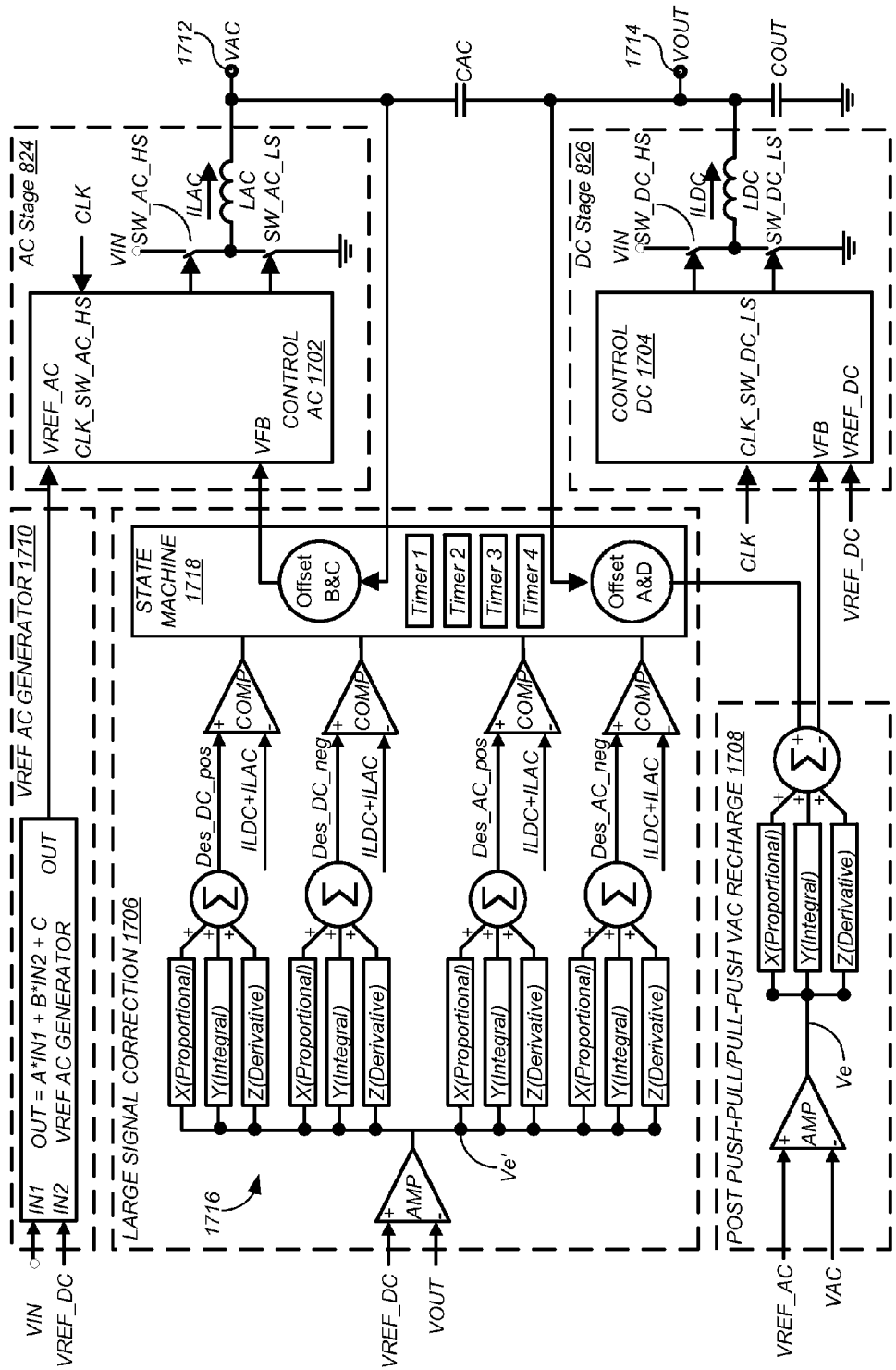
FIG. 17 illustrates one example implementation according to a particular embodiment.

FIG. 17 illustrates one example implementation of an embodiment. The control circuits in this example system includes an AC control block 1702, a DC control block 1704, a LARGE SIGNAL CORRECTION block 1706, a VREF AC GENERATOR 1710, and a POST PUSH-PULL/PULL-PUSH VAC RECHARGE block 1708.

The AC control block 1702, together with the switches SW_AC_HS and SW_AC_LS, form a conventional step-down switching regulator including a reference voltage input, VREF_AC, a feedback voltage input, VFB, and a clock input, CLK, controlling the switch SW_AC_HS (e.g., to turn on). The AC control block 1702 regulates the VAC node 1712 at VREF_AC (e.g., VIN−VREF) when the LARGE SIGNAL CORRECTION block 1706 is not active. The regulation of the VAC node 1712 when the LARGE SIGNAL CORRECTION block 1706 is active is described below.

The DC control block 1704, together with the switches SW_DC_HS and SW_DC_LS, forms a conventional step-down switching regulator that includes a reference voltage input, VREF_DC, a feedback voltage input, VFB, and a clock input, CLK, controlling the switch SW_DC_LS (e.g., to turn on). When the LARGE SIGNAL CORRECTION block 1706 is not active, the DC control block 1704 regulates the VOUT node at VREF_DC. The regulation of the VOUT node 1714 when the LARGE SIGNAL CORRECTION block 1706 is active is described below.

The VREF AC GENERATOR 1710 generates a VREF_AC reference voltage at the Control AC VREF_AC input of the AC control block 1702, and is defined as a function of VIN and VREF_DC (i.e., f(VIN, VREF_DC). The following is one example function of VIN and VREF_DC:

$VREF\_AC = A \times Vin + B \times VREF\_DC + C$

A, B and C are coefficients. As described for one example above, the following values may be used: A=1, B=−1, and C=0. Thus, VREF_AC will receive the following voltage:

$VREF\_AC = Vin - VREF\_DC$, which will configure the AC Stage 824 to maintain a controlled voltage on the VAC node 1712 of VIN−VREF_DC, where VREF_DC=VOUT in this example.

In this example, the LARGE SIGNAL CORRECTION block 1706 implements the push-pull and pull-push actions explained above. Control circuit LARGE SIGNAL CORRECTION block 1706 senses the output, VOUT, and input reference, VREF_DC, signals to detect a reference or load step and produce an output to modify the operation of the AC stage 824 and DC stage 826. In one embodiment, push-pull and pull-push may be implemented by generating 4 current thresholds: (Des_AC_pos), (Des_AC_neg), (Des_DC_pos) and (Des_DC_neg). Intuitively, the four current thresholds each represent a desired value of the sum of the LAC and LDC inductor currents ILAC+ILDC. The AC and DC naming convention is used because each one of the current thresholds is compared agaisnt the sum of the LAC and LDC inductor output currents ILAC+ILDC (e.g., the total output current) and each comparison acts either on the AC Stage 824 or the DC Stage 826. The four current thresholds are used to detect regulation failure, for example, when the sum of the currents of the inductors ILAC+ILDC is not appropriate and a push or a pull action is required to reestablish regulation.

In this example, each of the current thresholds may be formed by a controller 1716 using combination of a Proportional, an Integral and an Derivative term of the error signal Ve'=(VOUT−VREF_DC), as follows:

$$IDES = X \cdot Ve' + Y \cdot \int Ve' dt + Z \cdot \frac{dVe'}{dt}$$

X, Y, Z are system coefficients. Each one of the four current thresholds may be generated with a different set of X, Y, Z coefficients. The Proportional term depends on the present (instantaneous) error, the Integral term on an accumulation of past errors, and the Differential term on the prediction of future errors. Proportional, Integral, Derivative feedback control calculates an error value as the difference between a measured process variable and its desired value (e.g., VREF_DC−VOUT). The controller 1716 attempts to minimize the error by adjusting the control inputs.

A state machine 1718 compares each one of the current thresholds with the sum of the inductor currents Isum= (ILDC+ILAC) to trigger the 4 different cases (A(Push), B(Pull), C(Pull), and D(Push)) to perform the Push-Pull and Pull-Push actions described above. The inductor currents ILDC and ILAC may be sensed using current sense circuitry (not shown), for example. Table 1 illustrates the conditions for producing a push/pull or pull/push operation.

TABLE 1

| Case | Condition | Action |
| --- | --- | --- |
| A (Push) | Isum < {Des_DC_pos} & C has not taken place in the last (timer1) | CONTROL DC (VFB) low |
| B (Pull) | Isum > { Des_AC_pos } & A has taken place in the last (timer2) | CONTROL AC (VFB) high |
| C (Pull) | Isum > { Des_AC_neg } & A has not taken place in the last (timer3) | CONTROL AC (VFB) high |
| D (Push) | Isum < { Des_DC_neg } & C has taken place in the last (timer4) | CONTROL DC (VFB) low |

Figure 18:
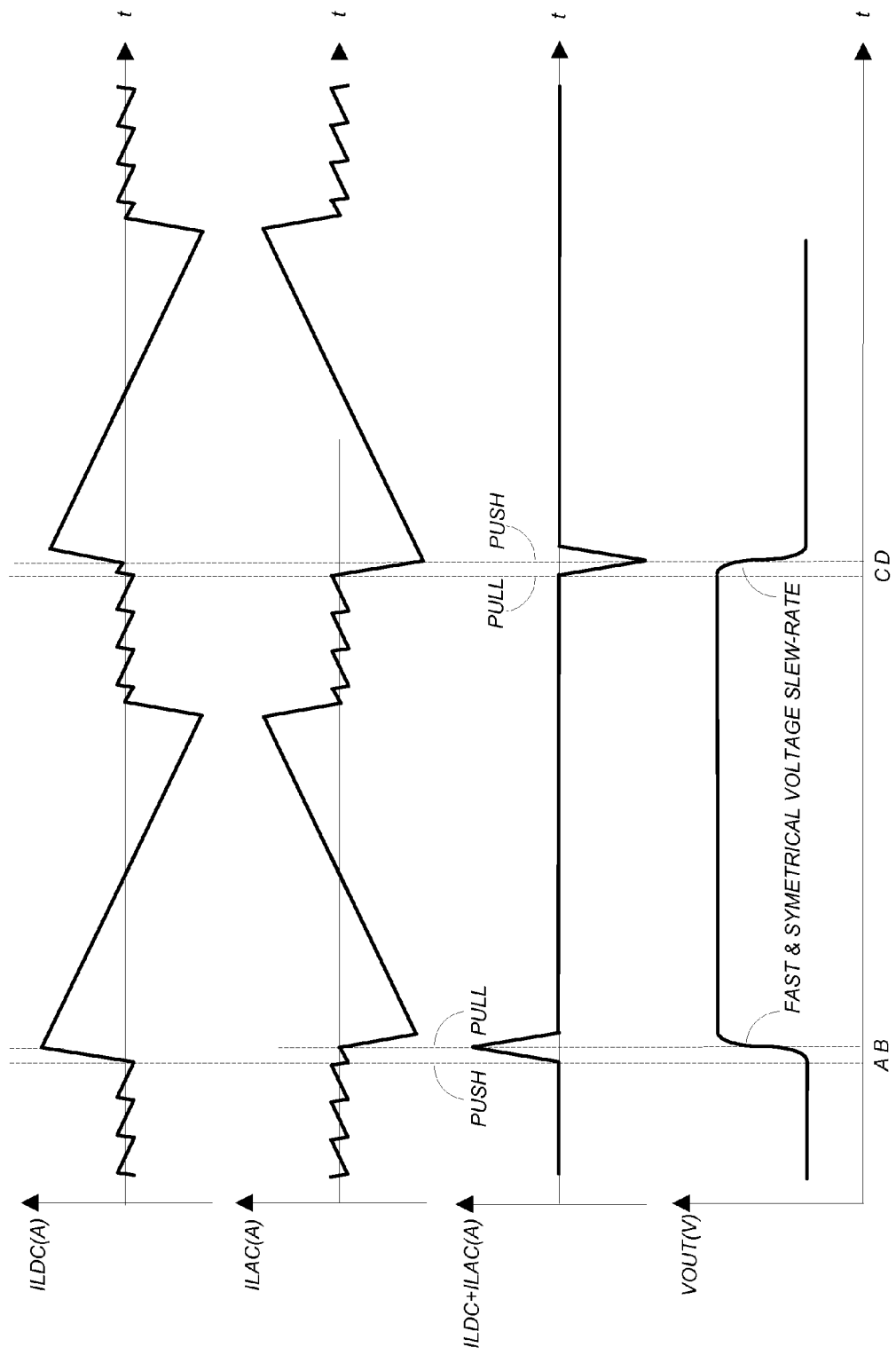
FIG. 18 illustrates push-pull and pull-push waveforms marked with the cases A, B, C and D.

Table 1 summarizes the state-machine conditions leading to the push-pull and pull-push actions. FIG. 18 illustrates push-pull and pull-push waveforms marked with the cases A, B, C and D.

Note that delay elements (not shown in FIG. 17) can be implemented in the state machine to force a delay between the end of a push and the beginning of a pull in a push-pull action, and also between the end of a pull and the beginning of a push in a pull-push action.

If the output voltage is commanded to step up (e.g., if VREF_DC is stepped up), then VREF_DC will increase above VOUT, and Des_DC_pos will be greater than ILDC+ILAC, which triggers Case A. In this example, an additional constraint that Case C has not taken place for at least some specified period of time (e.g., timer1) sets a minimum time that a push-pull may follow a pull-push. Case A causes VFB for the DC Stage 826 to be driven low, forcing a positive current slew from the DC Stage 826. A pull (Case B) occurs when the total output current Isum is greater than Des_AC_pos and Case A (a push) has taken place within a specified time period (e.g., timer2). The AC Stage 824 then is commanded to produce a negative current slew (Case B), for example. Case B causes VFB for the AC Stage 824 to be driven high, forcing a negative current slew from the AC Stage 824. In this way, a positive current pulse is created and pushed to the output node 1714. The pulse duration is dependent on finite slew times (±Vin/L) and the delay between events A and B, which are adjusted for a target net positive slew rate.

If the output voltage is commanded to step down (e.g., if VREF_DC is stepped down), then VREF_DC will decrease below VOUT, and Des_AC_neg will be less than ILDC+ILAC, which triggers Case C. In this example, an additional constraint that Case A has not taken place for at least some specified period of time (e.g., timer3) sets a minimum time that a pull-push may follow a push-pull. Case C causes VFB for the AC Stage 824 to be driven high, forcing a negative current slew from the AC Stage 824. A push (Case D) occurs when the total output current Isum is less than Des_DC_neg and Case C (a pull) has taken place within a specified time period (e.g., timer4). Case D causes VFB for DC Stage 826 to be driven low, forcing a positive current slew from the DC Stage 826. In this way, a negative current pulse is created and pulled from the output node 1714. The pulse duration is dependent on finite slew times (±Vin/L) and the delay between Cases C and D, which are adjusted for a target net negative slew rate.

This example implementation forces only the inductor featuring the highest current slew-rate (in the required direction) to slew for each one of the A, B, C and D cases. However, in another embodiment, the system could be designed to also force the opposite stage with the lower current slew-rate (in the required direction) to slew for each one of those 4 cases.

As explained above, a push-pull or a pull-push event will discharge the CAC capacitor and the VAC node 1712 voltage deviates from (VIN−REF). In order to recharge as fast as possible, in preparation for the next transient, the ControlDC regulator may sink from the VOUT node 1714 an equal current as is sourced to the VAC node 1712 by the ControlAC regulator. A control circuit 1708 from the VAC node 1712 to an input of the DC stage 826 senses VAC and modifies the operation of the DC stage 826. In this example, circuit 1708 produces a current in node 1714 to offset a corresponding current in node 1714 from AC stage to reset voltage VAC on the node 1712. The POST PUSH-PULL/PULL-PUSH VAC RECHARGE block 1708 adds a signal (or offset) on top of the VOUT voltage and feeds the sum to the ControlDC feedback node. This forces the LDC inductor to sink the CAC recharge current as described above. In this example, the added signal has PID form and is generated as follows:

$$X \cdot Ve + Y \cdot \int Ve dt + Z \cdot \frac{dVe}{dt}$$

where X, Y and Z are coefficients unique to this recharge function and may be set to match the transfer function of the ControlAC switching regulator 824. In this example, the POST PUSH-PULL/PULL-PUSH VAC RECHARGE block 1708 includes an error amplifier AMP that receives VREF_AC (e.g., the desired value of the VAC node 1712, VIN−VREF) and VAC (e.g., the actual voltage at the VAC node 1712) and produces an error signal, Ve. Proportional, Integral, and Derivative terms may be determined and combined to generate the appropriate signal in the DC Stage 826 feedback loop to drive the feedback input of the ControlDC block 1704, which in turn drives switches SW_DC_HS and SW_DC_LS to sink a current to offset the current used to recharge the CAC capacitor.

Various embodiments can be extended to various forms of multi-phase architectures. As for a conventional step-down regulator, a multi-phase architecture presents several advantages, such as: 1) reducing the current level of individual power switch and inductors; 2) offering higher current slew rates and lower voltage ripple, when operated out of phase.

Figure 19:
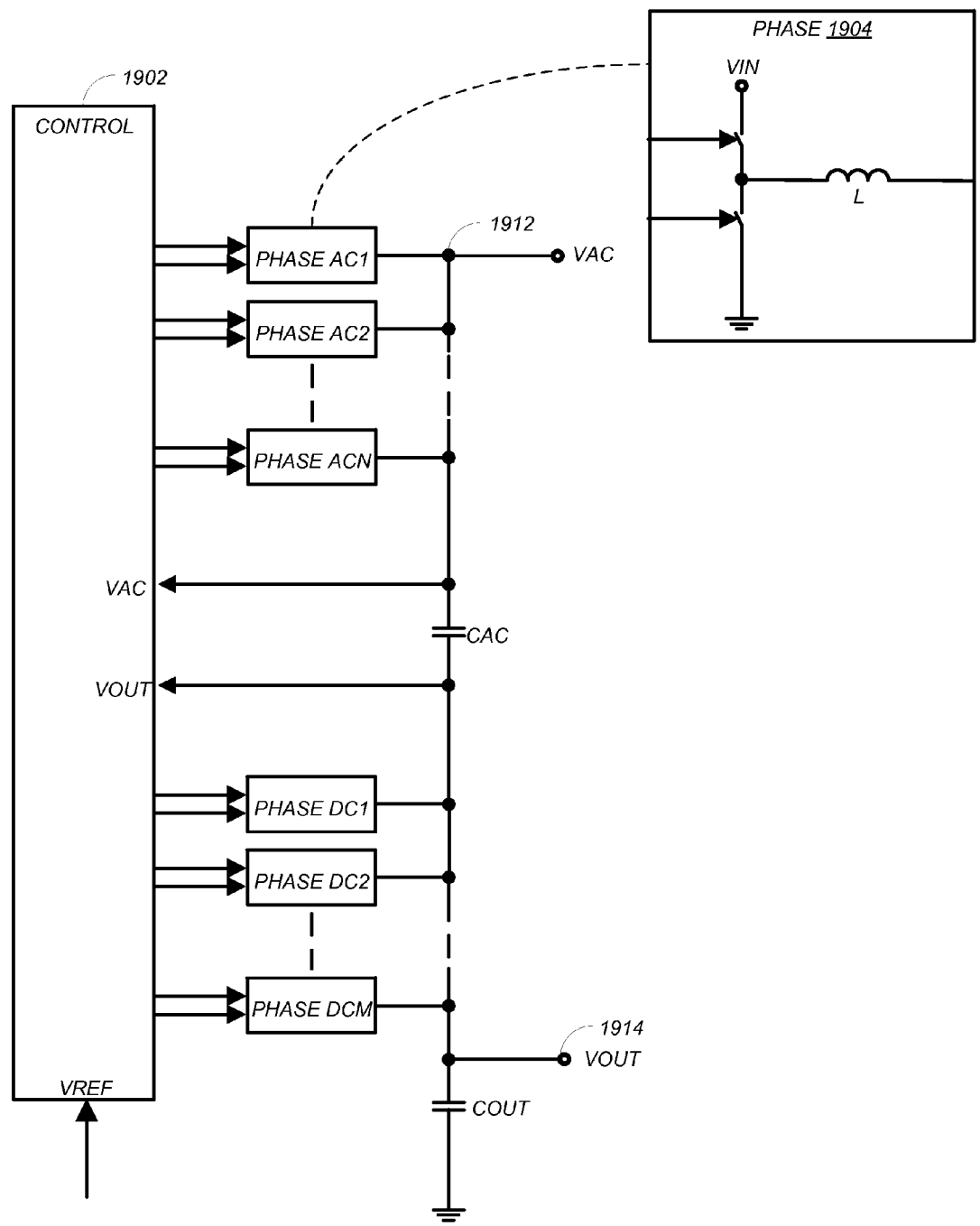
FIG. 19 shows a first multi-phase implementation example where N AC inductors are connected to the node VAC and M DC inductors are connected to the VOUT output node.

FIG. 19 shows a first multi-phase implementation example where N AC inductors L are connected to the node VAC and M DC inductors L are connected to the VOUT output node 1914. In particular, the implementation includes N AC phases PHASE AC1 through PHASE ACN, and M DC phases PHASE DC1 through PHASE DCM. Each of the AC phases and DC phases is implemented as shown at 1904. Note that each inductor L may have a different inductance value.

Figure 20:
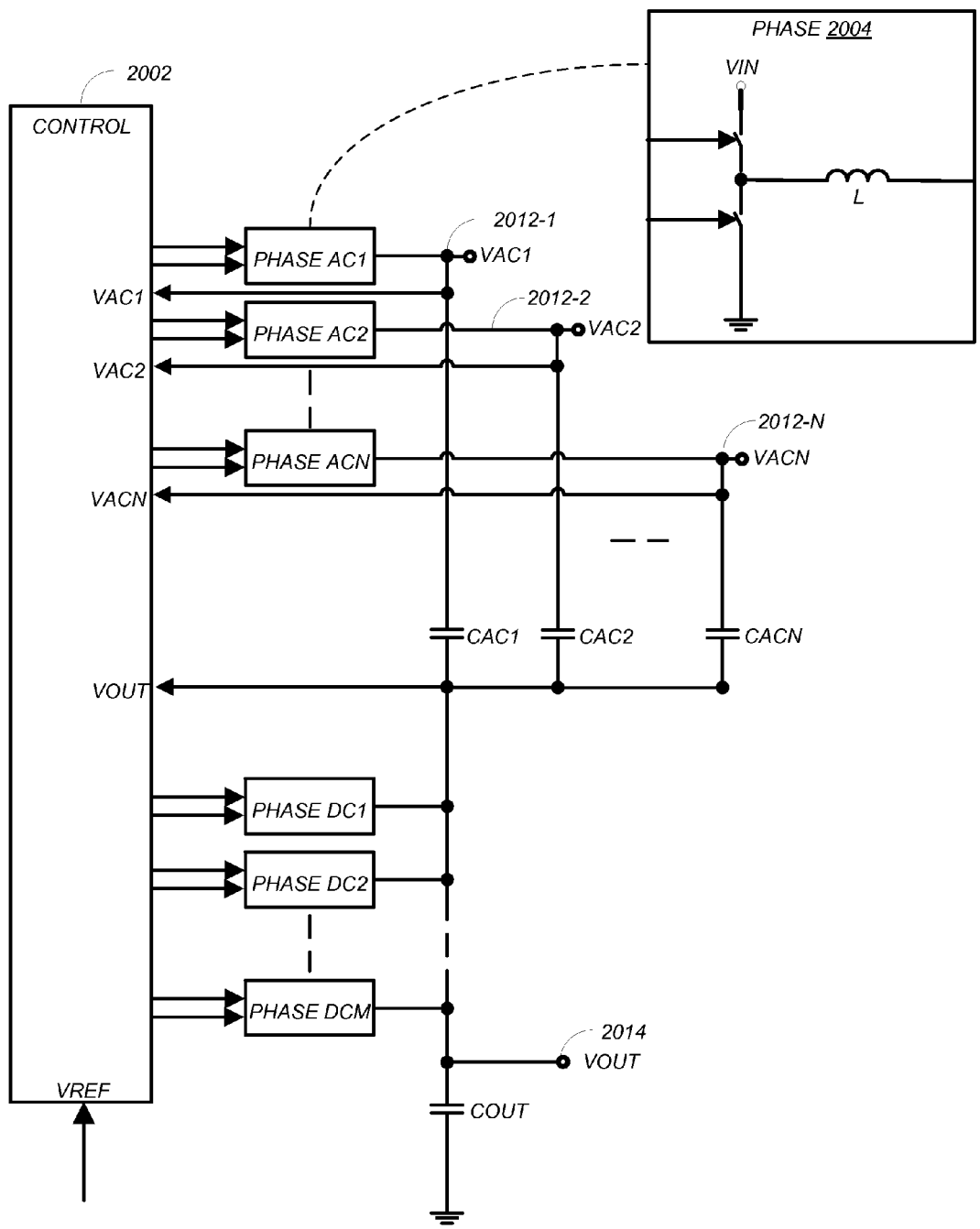
FIG. 20 shows a second multi-phase implementation example where N AC inductors are connected to N VAC nodes, and M DC inductors are connected to the VOUT output node.

FIG. 20 shows a second multi-phase implementation example where N AC inductors are connected to N VAC nodes 2012-1 through 2012-N, and M DC inductors are connected to the VOUT output node 2014. In particular, the implementation includes N AC phases PHASE AC1 through PHASE ACN, and M DC phases PHASE DC1 through PHASE DCM. Each of the AC phases and DC phases is implemented as shown at 2004. Note that each inductor L may have a different inductance value.

Figure 21:
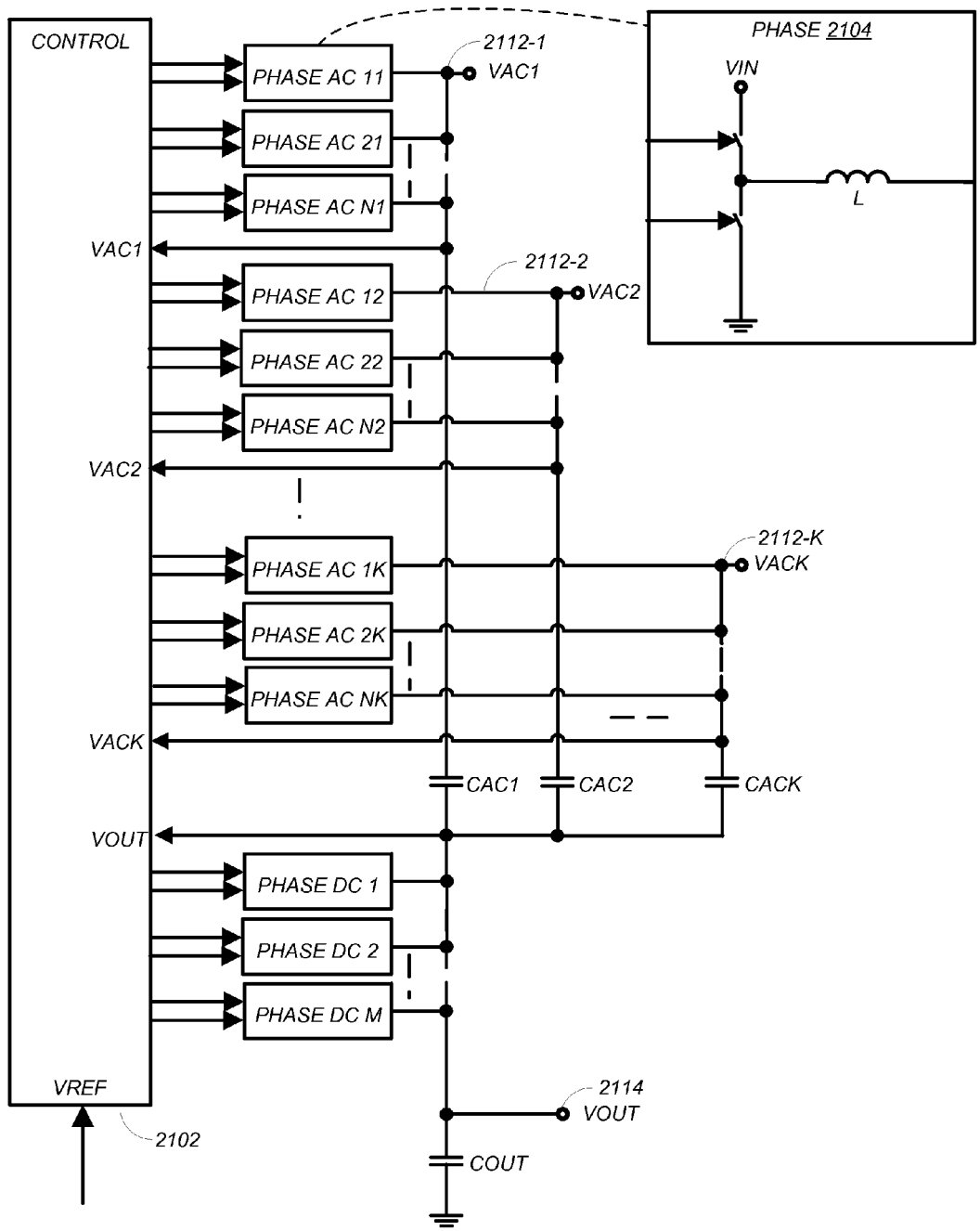
FIG. 21 shows a third multi-phase implementation example with K groups of N AC inductors and M DC inductors.

FIG. 21 shows a third multi-phase implementation example with K groups of N AC inductors and M DC inductors. Each DC inductor is connected to a VOUT output node 2114. Each one of the K groups of N AC inductors is connected to a respective one of VAC nodes 2112-1 through 2112-K. Each of the K nodes 2112 is connected by a respective one of capacitors CAC1 through CACK to the VOUT output node 2114. In particular, the implementation includes N×K AC phases PHASE AC11 through PHASE ACNK, and M DC phases PHASE DC1 through PHASE DCM. Each of the AC phases and DC phases is implemented as shown at 2104. Note that each inductor L may have a different inductance value. In some embodiments, the K groups of AC phase might include different numbers of PHASE AC.

Figure 22:
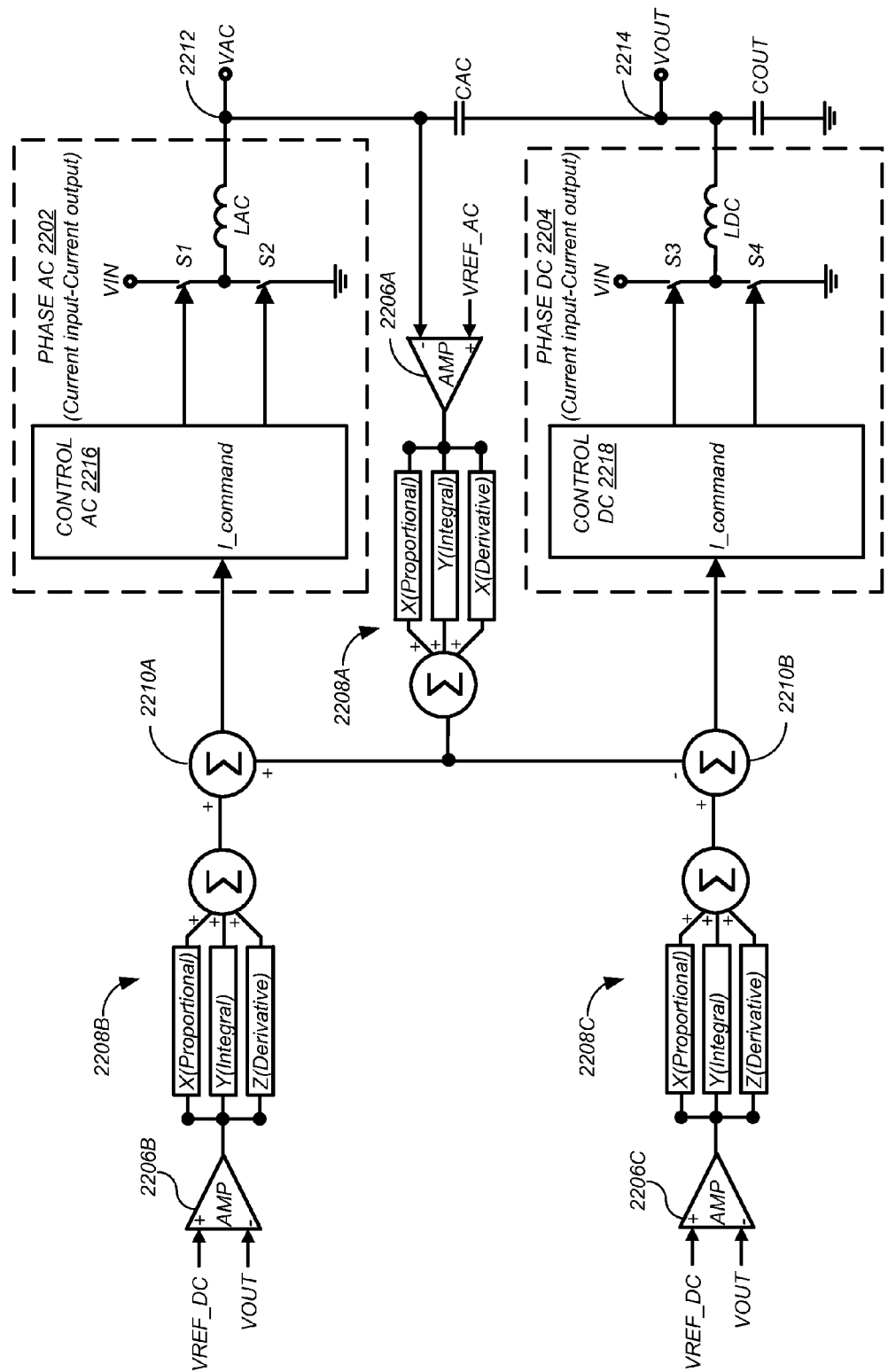
FIG. 22 illustrates another example implementation according to a particular embodiment.

FIG. 22 illustrates another example embodiment. The system shown in this example includes two current input/current output switching regulator stages PHASE AC 2202 and PHASE DC 2204, a first control circuit having an input coupled to VAC node 2212 including amplifier 2206A and PID element (Proportional, Integral and Derivative summing element) 2208A, a second control circuit having an input coupled to VOUT node 2214 including amplifier 2206B and PID element 2208B, and a third control circuit having an input coupled to VOUT node 2214 including amplifier 2206C and PID element 2208C. An output of the first control circuit is combined with an output of the second control circuit in summing element 2210A and coupled to an input of stage PHASE AC 2202. An output of the first control circuit is combined with an output of the third control circuit in summing element 2210B and coupled to an input of stage PHASE DC 2204. The VAC output node 2212 of the PHASE AC 2202 is connected to the VOUT output node 2214 of the PHASE DC 2204 through a capacitor CAC. The VOUT output node 2214 is also connected to the system ground through a capacitor COUT. Each switching regulator stage 2202, 2204 respectively includes additional control circuits 2216 and 2218, two power switches S1, S2 and S3, S4, and an output inductance LAC and LDC.

The current command of the PHASE AC switching regulator 2202 is the sum of two components: the difference between VOUT and VREF_DC (amplified by the amplifier 2206B and then processed by the PID element 2208B) and the difference between VAC and VREF_AC (amplified by the amplifier 2206A and then processed by the PID element 2208A). The second and third control circuits from VOUT node 2214 to the input of stages PHASE AC and PHASE DC may be configured to have wide bandwidth for responding to a transient on the VOUT node 2214. The first control circuit from VAC node 2212 to stages PHASE AC and PHASE DC may be configured to have a lower bandwidth than the second and third control circuits for resetting the VAC voltage on node 2212 via CAC capacitor recharge, for example. The first control circuit between the VAC node 2212 further produces both a CAC recharge current (e.g., via an additive signal at 2210A to stage 2202) and a corresponding opposite current component (e.g., via a subtractive signal at 2210B to stage 2204) to offset current from stage 2202 to reset the voltage on the CAC capacitor without impacting the load current, for example.

The current command of the PHASE DC switching regulator 2204 is the difference between two components: (i) first, a difference between VOUT and VREF_DC (amplified by the amplifier 2206C and then processed by the PID element 2208C) and (ii) second, a difference between VAC and VREF_AC (amplified by the amplifier 2206A and then processed by the PID element 2208A). Note that each PID element 2208 may use a different set of parameters for the linear, derivative, integral and integration constant parameters. Similarly, each of the three amplifiers 2206 can be set up with a different gain term.

The embodiment of FIG. 22 provides a very linear response and achieves a fast and symmetrical regulation of the VOUT output node 2214 by providing a push-pull and push-pull actions when it is required. The linear nature of this implementation makes it very easy to stabilize. Note that this implementation can easily be converted to voltage mode and/or multi-phase.

Further Illustrative Examples and Embodiments

The above described techniques may be applied to a wide range of implementations and embodiments. For example, in one embodiment, the present disclosure includes an electronic circuit comprising a first switching regulator stage to receive a first input voltage and produce a first voltage on a first node, a second switching regulator stage to receive the first input voltage and produce a second voltage on a second node, and a capacitor comprising a first terminal coupled to the first node and a second terminal coupled to the second node, wherein the first switching regulator stage and the second switching regulator stage are configured to regulate the first voltage on the first node and to regulate the second voltage on the second node.

In one embodiment, the first voltage on the first node is different than the second voltage on the second node.

In one embodiment, the first switching regulator stage operates at a first duty cycle and the second switching regulator stage operates at a second duty cycle greater than the first duty cycle.

In one embodiment, the first input voltage is greater than the second voltage on the second node, and wherein the second voltage on the second node is greater than the first voltage on the first node.

In one embodiment, the second voltage on the second node is approximately equal to a sum of a first coefficient multiplied by the first input voltage, a second coefficient multiplied by the first voltage on the first node, and a constant.

In one embodiment, the second voltage on the second node is approximately equal to one-half the first input voltage.

In one embodiment, the second voltage on the second node is approximately equal to a difference between the first input voltage and the first voltage on the first node.

In one embodiment, the first switching regulator stage comprises a first inductor and the second switching regulator stage comprises a second inductor, wherein a voltage across the first inductor in a first switching phase is approximately equal to a voltage across the second inductor in a second switching phase and a voltage across the first inductor in the second switching phase is approximately equal to a voltage across the second inductor in the first switching phase.

In one embodiment, the first switching regulator stage comprises a first switch configured between a third node and a first switching node, wherein the third node is configure to receive the first input voltage, a second switch configured between the first switching node and a fourth node, wherein the fourth node is configured to receive a reference voltage, and a first inductor configured between the first switching node and the first node. Further, the second switching regulator stage comprises a third switch configured between a fifth node and a second switching node, wherein the fifth node is configure to receive the first input voltage, a fourth switch configured between the second switching node and a sixth node, wherein the sixth node is configure to receive the reference voltage, and a second inductor configured between the second switching node and the second node. The circuit further comprises a control circuit, the control circuit comprising a first input coupled to the first node, a second input coupled to the second node, a first output coupled to the first switch and the second switch to regulate the first voltage on the first node, and a second output coupled to the third switch and the fourth switch to regulate the second voltage on the second node.

In one embodiment, the circuit further comprises a second capacitor and a load circuit, wherein the second capacitor and the load circuit are configured between the first node and a reference voltage.

In one embodiment, the circuit further comprises a processor having a power supply input coupled to the first node, wherein the first voltage on the first node is changed based on a workload of the processor.

In one embodiment, the second voltage on the second node is based on the first voltage on the first node such that a slew rate at the first node produced by the first switching regulator stage and the second switching regulator stage is independent of the first voltage on the first node.

In one embodiment, the first switching regulator stage comprises a first inductor and the second switching regulator stage comprises a second inductor, wherein a sum of a first positive current slew rate in the first inductor and a second positive slew rate of the second inductor is equal to a magnitude of a sum of a first negative current slew rate in the first inductor and a second negative slew rate of the second inductor.

In one embodiment, the first switching regulator stage pushes a first current to the first node during a first time period, and wherein the second switching regulator stage pulls a second current having a magnitude approximately equal to the first current from the first node through the capacitor during a second time period following the first time period.

In one embodiment, the second switching regulator stage pulls a first current from the first node through the capacitor during a first time period, and wherein the first switching regulator stage pushes a second current having a magnitude approximately equal to the first current to the first node during a second time period following the first time period.

In one embodiment, the second switching regulator stage generates a first current having a first polarity to the first node through the capacitor during a first time period, and in accordance therewith, changes a voltage on the capacitor at the second node, wherein the second switching regulator stage generates a second current having a second polarity opposite the first polarity during a second time period following the first time period to reset the voltage on the capacitor to the second voltage, and wherein the first switching regulator stage generates a third current to the first node comprising at least a current component having an approximately equal magnitude and opposite polarity to the second current during the second time period.

In one embodiment, the first current has a first slew rate and the third current has a second slew rate, and wherein the first slew rate is greater than the second slew rate.

In one embodiment, DC load current is provided to the first node by the first switching regulator stage and wherein AC current is provided to the first node through the capacitor by the second switching regulator stage.

In one embodiment, the circuit further comprises a control circuit, wherein the control circuit comprises a first circuit and a second circuit, wherein the first circuit has an input coupled to the first node and an output coupled to the second switching regulator stage to modify the operation of the second switching regulator stage, and wherein the second circuit has an input coupled to the second node and an output coupled to the first switching regulator stage to modify the operation of the first switching regulator stage.

In one embodiment, the circuit further comprises a control circuit, wherein the control circuit comprises a first circuit and a second circuit, wherein the first circuit has a first bandwidth for responding to a transient on the first node and the second circuit has a second bandwidth for resetting a voltage on the second node, wherein the first bandwidth is greater than the second bandwidth.

In one embodiment, the circuit further comprises a control circuit having an input coupled to the second node to receive the second voltage and an output coupled to the first switching regulator stage to produce a current in the first node to offset a corresponding current in the first node from the second switching regulator stage to reset the second voltage on the second node.

In one embodiment, the circuit further comprises a control circuit, wherein the control circuit regulates the first voltage on the first node using a first reference voltage, and wherein the control circuit regulates the second voltage on the second node using a second reference voltage.

In one embodiment, the second reference voltage is generated based on at least the first reference voltage.

In one embodiment, the circuit further comprises a control circuit, wherein the control circuit comprises a first reference voltage for regulating the first voltage on the first node and a second reference voltage for regulating the second voltage on the second node, wherein the second reference voltage is greater than the first reference voltage.

In another embodiment, the present disclosure includes a circuit comprising a first switch having a first input terminal and a second terminal coupled to a first switching node, a second switch having a first terminal coupled to the first switching node and a second terminal, a first inductor having a first terminal coupled to the first switching node and a second terminal coupled to a first output node, a third switch having a first input terminal and a second terminal coupled to a second switching node, a fourth switch having a first terminal coupled to the second switching node and a second terminal, a second inductor having a first terminal coupled to the second switching node and a second terminal coupled to a second output node, a capacitor having a first terminal coupled to the first output node and a second terminal coupled to the second output node, and a control circuit comprising a first input coupled to the first output node, a second input coupled to the second output node, wherein the control circuit controls the first switch and the second switch to produce a regulated first voltage on the first output node, and wherein the control circuit controls the third switch and the fourth switch to produce a regulated second voltage on the second output node.

One embodiment includes an apparatus comprising a first switching regulator stage coupled to an output node, a second switching regulator stage coupled to the output node through a capacitor, the capacitor having a first terminal coupled to the output node and a second terminal coupled to the second switching regulator stage, wherein the first switching regulator stage has a feedback input coupled to a first terminal of the capacitor and the second switching regulator stage has a second feedback input coupled to the second terminal of the capacitor. The stages are configured to control a voltage on the output node to control a voltage on the second terminal of the capacitor.

Another embodiment includes an apparatus comprising a first switching regulator stage having an input to receive an input voltage, the first switching regulator stage coupled to an output node, the first switching regulator stage having a first control loop to control the voltage on the output node, a second switching regulator stage having an input to receive the input voltage, the second switching regulator stage coupled to the output node through a capacitor, the capacitor having a first terminal coupled to the output node and a second terminal coupled to the second switching regulator stage, the second switching regulator stage having a second control loop to control the voltage on the second terminal of the capacitor, wherein the first control loop maintains the voltage on the output node at a first voltage, and wherein the second control loop maintains the voltage on the second terminal of the capacitor at a second voltage that is a function of the input voltage and the first voltage.

In another embodiment the present disclosure includes switching regulator methods (processes). Although in the described embodiments the elements of the processes and methods herein are presented in one arrangement, other embodiments may feature other arrangements. For example, in various embodiments, some or all of the elements of the process can be executed in a different order, concurrently, and the like based on the application as understood by those skilled in the art. In addition, some or all of the elements of the process can be performed automatically, that is, without human intervention.

One method comprises coupling a first input voltage through a first switching regulator stage to produce a first voltage on a first node, coupling the first input voltage through a second switching regulator stage to produce a second voltage on a second node, wherein the first node is coupled to the second node by a capacitor, and regulating the first voltage on the first node and the second voltage on the second node.

In one embodiment, regulating the first voltage on the first node and the second voltage on the second node comprises sensing the first voltage and the second voltage, controlling a first switch, configured between the first input voltage and a first switching node, and a second switch, configured between the first switching node and a reference voltage, to selectively couple a first terminal of a first inductor between the first input voltage and the reference voltage to regulate the first voltage on the first node, wherein a second terminal of the first inductor is coupled to the first node, and controlling a third switch, configured between the first input voltage and a second switching node, and a fourth switch, configured between the second switching node and the reference voltage, to selectively couple a first terminal of a second inductor between the first input voltage and the reference voltage to regulate the second voltage on the second node, wherein a second terminal of the second inductor is coupled to the second node.

In one embodiment, the method further comprises providing an output current to a load circuit coupled to the first node and storing the first voltage on a second capacitor coupled to the first node, wherein the second capacitor and the load circuit are configured between the first node and a reference voltage.

In one embodiment, the method further comprises changing the first voltage on the first node based on a workload of the processor having a power supply input coupled to the first node.

In one embodiment, the method further comprises generating, by the second switching regulator stage, a first current having a first polarity to the first node through the capacitor during a first time period, and in accordance therewith, changing a voltage on the capacitor at the second node, generating, by the second switching regulator stage, a second current having a second polarity opposite the first polarity during a second time period following the first time period to reset the voltage on the capacitor to the second voltage, and generating, by the first switching regulator stage, a third current to the first node comprising at least a current component having an approximately equal magnitude and opposite polarity to the second current during the second time period.

In one embodiment, the method further comprises coupling the first voltage on the first node to an input of a first control circuit, the first control circuit modifying the operation of the second switching regulator stage and coupling the second voltage on the second node to an input of a second control circuit, the second control circuit modifying the operation of the first switching regulator stage.

In one embodiment, the method further comprises coupling the first voltage on the first node to an input of a first circuit and coupling the second voltage on the second node to an input of a second circuit, wherein the first circuit has a first bandwidth for responding to a transient on the first node and the second circuit has a second bandwidth for resetting a voltage on the second node, wherein the first bandwidth is greater than the second bandwidth.

In one embodiment, the method further comprises coupling the second voltage on the second node to an input of a control circuit, the control circuit controlling the first switching regulator stage to produce a current in the first node to offset a corresponding current in the first node from the second switching regulator stage to reset the second voltage on the second node.

In one embodiment, the method further comprises generating a first reference voltage to control the first voltage on the first node and generating a second reference voltage to control the second voltage on the second node, wherein the second reference voltage is greater than the first reference voltage.

In one embodiment, the second reference voltage is generated based on the first reference voltage and the first input voltage.

Figure 23:
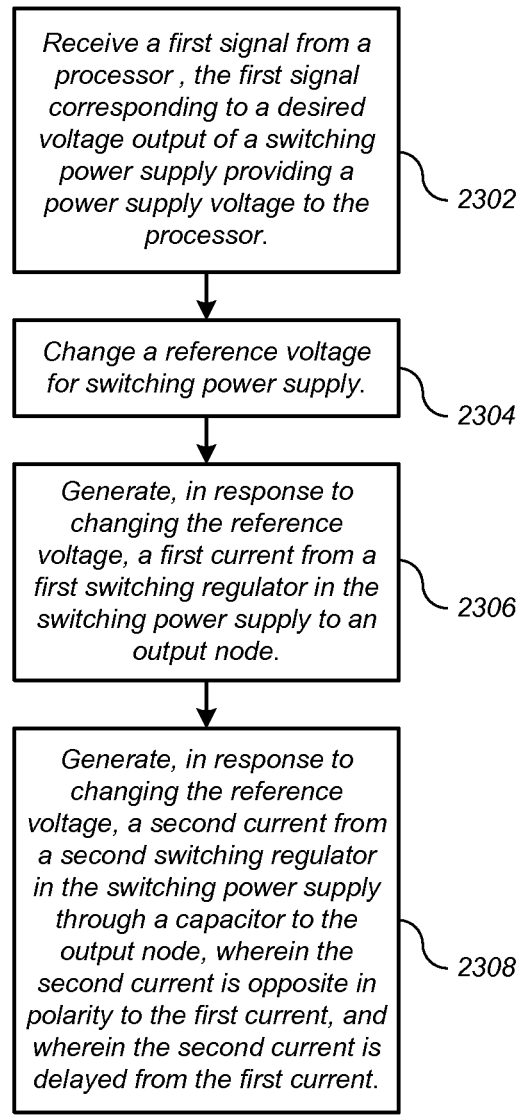
FIG. 23 shows a process according to one embodiment.

FIG. 23 illustrates another example process. Referring to FIG. 23, the process may include, at 2302, receiving a first signal from a processor, the first signal corresponding to a desired voltage output of a switching power supply providing a power supply voltage to the processor. The process may include, at 2304, changing a reference voltage for the switching power supply. At 2306, the process includes generating, in response to said changing the reference voltage, a first current from a first switching regulator stage in the switching power supply to an output node. At 2308, the process includes generating, in response to said changing the reference voltage, a second current from a second switching regulator stage in the switching power supply through a capacitor to the output node, wherein the second current is opposite in polarity to the first current, and wherein the second current is delayed from the first current.

Figure 24:
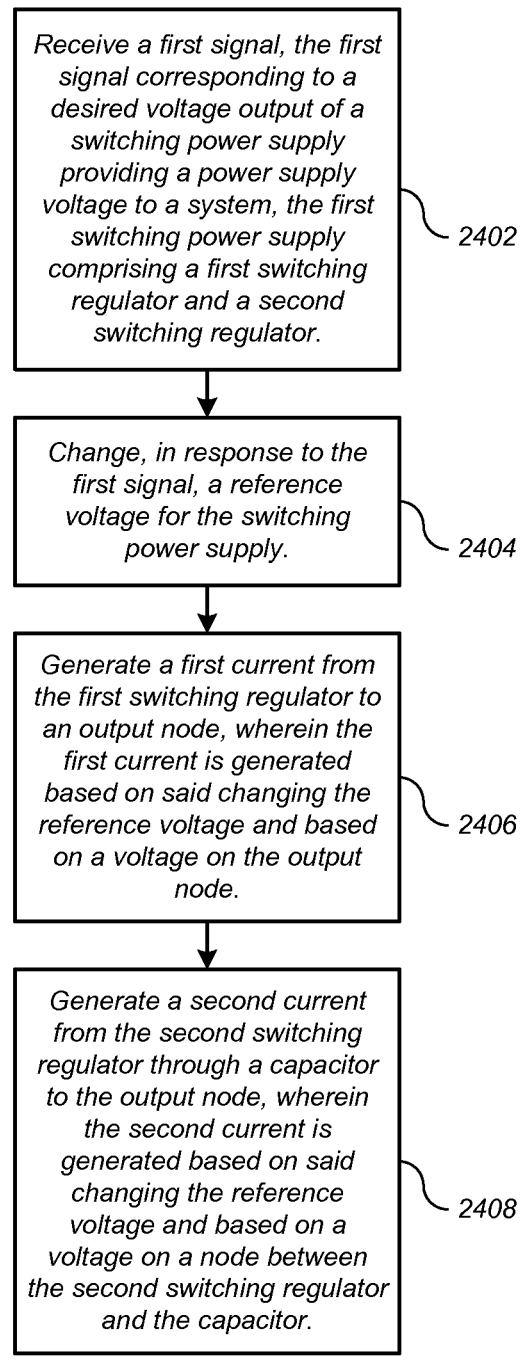
FIG. 24 shows a process according to one embodiment.

Referring to FIG. 24, the process may include, at 2402, receiving a first signal, the first signal corresponding to a desired voltage output of a switching power supply providing a power supply voltage to a system, the first switching power supply comprising a first switching regulator stage and a second switching regulator stage. The process may include, at 2404, changing, in response to the first signal, a reference voltage for the switching power supply. The process may include, at 2406, generating a first current from the first switching regulator stage to an output node, wherein the first current is generated based on said changing the reference voltage and based on a voltage on the output node.

The process may include, at 2408, generating a second current from the second switching regulator stage through a capacitor to the output node, wherein the second current is generated based on said changing the reference voltage and based on a voltage on a node between the second switching regulator stage and the capacitor.

Figure 25:
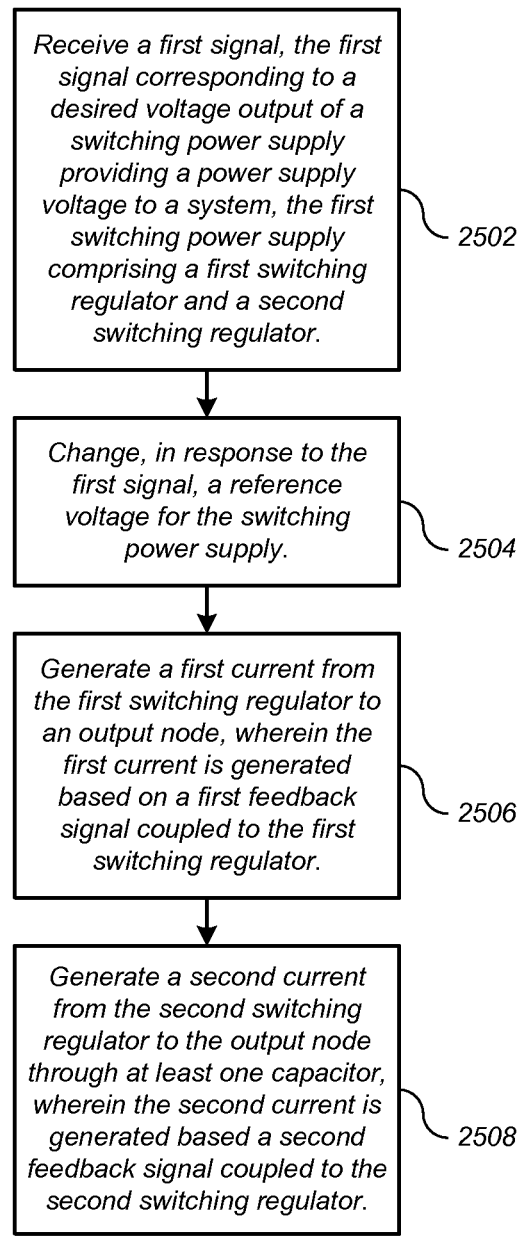
FIG. 25 shows a process according to one embodiment.

Referring to FIG. 25, the process may include, at 2502, receiving a first signal, the first signal corresponding to a desired voltage output of a switching power supply providing a power supply voltage to a system, the first switching power supply comprising a first switching regulator stage and a second switching regulator stage. The process may include, at 2504, changing, in response to the first signal, a reference voltage for the switching power supply. The process may include, at 2506, generating a first current from the first switching regulator stage to an output node, wherein the first current is generated based on a first feedback signal coupled to the first switching regulator stage. The process may include, at 2508, generating a second current from the second switching regulator stage to the output node through at least one capacitor, wherein the second current is generated based a second feedback signal coupled to the second switching regulator stage.

Figure 26:
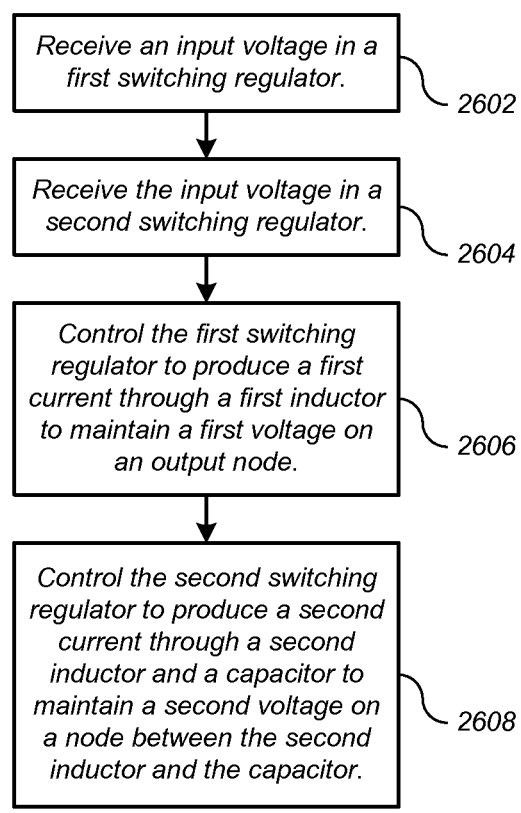
FIG. 26 shows a process according to one embodiment.

Referring to FIG. 26, the process may include, at 2602, receiving an input voltage in a first switching regulator stage. The process may include, at 2604, receiving the input voltage in a second switching regulator stage. The process may include, at 2606, controlling the first switching regulator stage to produce a first current through a first inductor to maintain a first voltage on an output node. The process may include, at 2608, controlling the second switching regulator stage to produce a second current through a second inductor and a capacitor to maintain a second voltage on a node between the second inductor and the capacitor.

In one embodiment, the first switching regulator stage produces the first current and the second switching regulator stage produces the second current in response to a change in a reference signal.

In one embodiment, the first switching regulator stage produces the first current and the second switching regulator stage produces the second current in response to a change in a load current.

In one embodiment, the method further comprises controlling the first switching regulator stage to generate a first capacitor recharge current and controlling the second switching regulator stage to generate a second capacitor recharge current, wherein the sum of the first capacitor recharge current and the second capacitor recharge current is approximately zero.

Another embodiment includes an apparatus comprising a first switching regulator stage comprising a first control loop, a second switching regulator stage comprising a second control loop, and a capacitor. An output of the second switching regulator stage is coupled to an output of the first switching regulator stage through the capacitor, and the first control loop controls a voltage at the output of the first switching regulator and the second control loop controls a voltage at the output of the second switching regulator.

In one embodiment, the first control loop comprises a first reference voltage for setting a first voltage on the output of the first switching regulator stage, and wherein the second control loop comprises a second reference voltage for setting a second voltage on the output of the second switching regulator stage, wherein the first and second voltages establish a voltage difference across the capacitor.

In one embodiment, the first control loop comprises a first circuit for introducing a first offset to generate a first current in the first switching regulator stage, and wherein the second control loop comprises a second circuit for introducing a second offset to generate a second current in the second switching regulator stage, wherein the first and second offsets are introduced in response to a change in a load current or in response to a signal triggering a change in the voltage at the output of the first switching regulator.

Another embodiment includes an apparatus comprising a first switching regulator stage comprising a first control loop, a second switching regulator stage comprising a second control loop having an output coupled to the first switching regulator stage through a capacitor, and wherein the first control loop controls a voltage at the output of the first switching regulator stage and the second control loop controls a voltage at the output of the second switching regulator stage, wherein, in response to a change in a load current or in response to a change in the voltage at the output of the first switching regulator stage, the first switching regulator stage generates a first current to a load having a first polarity and the second switching regulator stage, after a delay, generates a second current to the load having a second polarity opposite the first polarity.

Features and aspects of the disclosure may be implemented in digital electronic circuitry, or in computer hardware, firmware, software, or in combinations of them. Features of the disclosure, such as control algorithms, may be implemented in a computer program product tangibly embodied in a machine-readable storage device for execution by a programmable processor; and some method steps of the disclosure can be performed by a programmable processor executing a program of instructions to perform functions of the disclosure by operating on input data and generating output. Features and aspects of disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer may include one or more mass storage devices for storing data files; such devices include magnetic disks, such as internal hard disks and removable disks; magneto-optical disks; and optical disks. Storage devices suitable for tangibly embodying computer program instructions and data include volatile or non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), for example.

The above description illustrates various embodiments along with examples of how aspects of the embodiments may be implemented. The above examples and embodiments should not be deemed to be the only embodiments, and are presented to illustrate the flexibility and advantages of the various embodiments as defined by the following claims. Based on the above disclosure and the following claims, other arrangements, embodiments, implementations and equivalents will be evident to those skilled in the art and may be employed without departing from the spirit and scope of the embodiments as defined by the claims.

What is claimed is:

1. A switching regulator circuit, comprising:
a first switching regulator stage to receive a first input voltage and produce a first voltage on a first node, wherein the first switching regulator stage operates at a first duty cycle;
a second switching regulator stage to receive the first input voltage and produce a second voltage on a second node, wherein the second switching regulator stage operates at a second duty cycle, and wherein during first and second time periods, a first current provided by the first switching regulator stage has a same increasing or decreasing operation as a second current provided by the second switching regulator stage;
a capacitor comprising a first terminal coupled to the first node and a second terminal coupled to the second node, wherein the first input voltage is greater than the second voltage on the second node, and wherein the second voltage on the second node is greater than the first voltage on the first node; and
wherein the first switching regulator stage and the second switching regulator stage are configured to regulate the first voltage on the first node and to regulate the second voltage on the second node in response to a first feedback input coupled to the first node and a second feedback input coupled to the second node, and wherein the first and second currents provide a voltage step at the first voltage within the first and second time periods.

2. The switching regulator circuit of claim 1, wherein the first voltage on the first node is different than the second voltage on the second node.

3. The switching regulator circuit of claim 1, wherein the second duty cycle is greater than the first duty cycle.

4. The switching regulator circuit of claim 1, wherein the second voltage on the second node is approximately equal to a sum of a first coefficient multiplied by the first input voltage, a second coefficient multiplied by the first voltage on the first node, and a constant.

5. The switching regulator circuit of claim 1, wherein the second voltage on the second node is approximately equal to one-half the first input voltage.

6. The switching regulator circuit of claim 1, wherein the second voltage on the second node is approximately equal to a difference between the first input voltage and the first voltage on the first node.

7. The switching regulator circuit of claim 1, wherein the first switching regulator stage comprises a first inductor and the second switching regulator stage comprises a second inductor, wherein a voltage across the first inductor in a first switching phase is approximately equal to a voltage across the second inductor in a second switching phase and the voltage across the first inductor in the second switching phase is approximately equal to the voltage across the second inductor in the first switching phase.

8. The switching regulator circuit of claim 1, wherein the first switching regulator stage comprises:
a first switch configured between a third node and a first switching node, wherein the third node is configured to receive the first input voltage;
a second switch configured between the first switching node and a fourth node, wherein the fourth node is configured to receive a reference voltage; and
a first inductor configured between the first switching node and the first node, the second switching regulator stage comprising:
a third switch configured between the third node and a second switching node;
a fourth switch configured between the second switching node and the fourth node; and
a second inductor configured between the second switching node and the second node,
and further comprising a control circuit, the control circuit comprising a first input coupled to the first node, a second input coupled to the second node, a first output coupled to the first switch and the second switch to regulate the first voltage on the first node, and a second output coupled to the third switch and the fourth switch to regulate the second voltage on the second node.

9. The switching regulator circuit of claim 1, further comprising a second capacitor and a load circuit, wherein the second capacitor and the load circuit are configured between the first node and a reference voltage.

10. The switching regulator circuit of claim 1, further comprising a processor having a power supply input coupled to the first node, wherein the first voltage on the first node is changed based on a workload of the processor.

11. The switching regulator circuit of claim 1, wherein the second voltage on the second node is based on the first voltage on the first node such that a slew rate at the first node produced by the first switching regulator stage and the second switching regulator stage is independent of the first voltage on the first node.

12. The switching regulator circuit of claim 1, wherein the first switching regulator stage comprises a first inductor and the second switching regulator stage comprises a second inductor, wherein a sum of a first positive current slew rate in the first inductor and a second positive slew rate of the second inductor is equal to a magnitude of a sum of a first negative current slew rate in the first inductor and a second negative slew rate of the second inductor.

13. The switching regulator circuit of claim 1, wherein the first switching regulator stage pushes the first current to the first node during the first time period, and wherein the second switching regulator stage pulls the second current having a magnitude approximately equal to the first current from the second node through the capacitor during the second time period that follows the first time period.

14. The switching regulator circuit of claim 1, wherein the second switching regulator stage pulls the second current from the second node through the capacitor during the first time period, and wherein the first switching regulator stage pushes the first current having a magnitude approximately equal to the second current to the first node during the second time period that follows the first time period.

15. The switching regulator circuit of claim 1, wherein the second switching regulator stage generates the second current having a first polarity to the second node through the capacitor during the first time period, and in accordance therewith, changes the second voltage on the capacitor at the second node, wherein the second switching regulator stage generates the second current having a second polarity opposite the first polarity during the second time period following the first time period to reset the voltage on the capacitor to the second voltage, and wherein the first switching regulator stage generates a third current to the first node comprising at least a current component having an approximately equal magnitude and opposite polarity to the second current during the second time period.

16. The switching regulator circuit of claim 15, wherein the first current has a first slew rate and the third current has a second slew rate, and wherein the first slew rate is greater than the second slew rate.

17. The switching regulator circuit of claim 1, wherein DC load current is provided to the first node by the first switching regulator stage and wherein AC current is provided to the first node through the capacitor by the second switching regulator stage.

18. The switching regulator circuit of claim 1, further comprising a control circuit having a first circuit and a second circuit, wherein the first circuit has an input coupled to the first node and an output coupled to the second switching regulator stage to modify the operation of the second switching regulator stage, and wherein the second circuit has an input coupled to the second node and an output coupled to the first switching regulator stage to modify the operation of the first switching regulator stage.

19. The switching regulator circuit of claim 1, further comprising a control circuit having a first circuit and a second circuit, wherein the first circuit has a first bandwidth for responding to a transient on the first node and the second circuit has a second bandwidth for resetting the second voltage on the second node, wherein the first bandwidth is greater than the second bandwidth.

20. The switching regulator circuit of claim 1, further comprising a control circuit having an input coupled to the second node to receive the second voltage and an output coupled to the first switching regulator stage to produce a current in the first node to offset a corresponding current in the first node from the second switching regulator stage to reset the second voltage on the second node.

21. The switching regulator circuit of claim 1, further comprising a control circuit, wherein the control circuit regulates the first voltage on the first node using a first reference voltage, and wherein the control circuit regulates the second voltage on the second node using a second reference voltage.

22. The switching regulator circuit of claim 21, wherein the second reference voltage is generated based on at least the first reference voltage.

23. The switching regulator circuit of claim 1, further comprising a control circuit having a first reference voltage for regulating the first voltage on the first node, and a second reference voltage for regulating the second voltage on the second node, wherein the second reference voltage is greater than the first reference voltage.

24. A switching regulator method, the method comprising:
coupling a first input voltage through a first switching regulator stage to produce a first voltage on a first node, wherein the first switching regulator stage operates at a first duty cycle;
coupling the first input voltage through a second switching regulator stage to produce a second voltage on a second node, wherein the first node is coupled to the second node by a capacitor, and wherein the second switching regulator stage operates at a second duty cycle;
providing, during first and second time periods, a first current by the first switching regulator stage, and a second current by the second switching regulator stage, wherein the first and second currents have a same increasing or decreasing operation; and
regulating the first voltage on the first node and the second voltage on the second node in response to a first feedback input coupled to the first node and a second feedback input coupled to the second node, and wherein the first and second currents provide a voltage step at the first voltage within the first and second time periods, wherein the first input voltage is greater than the second voltage on the second node, and wherein the second voltage on the second node is greater than the first voltage on the first node.

25. The method of claim 24, wherein the second duty cycle is greater than the first duty cycle.

26. The method of claim 24, wherein the second voltage on the second node is approximately equal to a difference between the first input voltage and the first voltage on the first node.

27. The method of claim 24, wherein the first switching regulator stage comprises a first inductor and the second switching regulator stage comprises a second inductor, wherein a voltage across the first inductor in a first switching phase is approximately equal to a voltage across the second inductor in a second switching phase and the voltage across the first inductor in the second switching phase is approximately equal to the voltage across the second inductor in the first switching phase.

28. The method of claim 24, wherein regulating the first voltage on the first node and the second voltage on the second node comprises:
sensing the first voltage and the second voltage;
controlling a first switch, configured between the first input voltage and a first switching node, and a second switch, configured between the first switching node and a reference voltage, to selectively couple a first terminal of a first inductor to the first input voltage and to the reference voltage to regulate the first voltage on the first node, wherein a second terminal of the first inductor is coupled to the first node; and
controlling a third switch, configured between the first input voltage and a second switching node, and a fourth switch, configured between the second switching node and the reference voltage, to selectively couple a first terminal of a second inductor to the first input voltage and to the reference voltage to regulate the second voltage on the second node, wherein a second terminal of the second inductor is coupled to the second node.

29. The method of claim 24, further comprising providing an output current to a load circuit coupled to the first node and storing the first voltage on a second capacitor coupled to the first node, wherein the second capacitor and the load circuit are configured between the first node and a reference voltage.

30. The method of claim 24, further comprising changing the first voltage on the first node based on a workload of a processor having a power supply input coupled to the first node.

31. The method of claim 24, wherein the second voltage on the second node is based on the first voltage on the first node such that a slew rate at the first node produced by the first switching regulator stage and the second switching regulator stage is independent of the first voltage on the first node.

32. The method of claim 24, wherein the first switching regulator stage comprises a first inductor and the second switching regulator stage comprises a second inductor, wherein a sum of a first positive current slew rate in the first inductor and a second positive slew rate of the second inductor is equal to a magnitude of a sum of a first negative current slew rate in the first inductor and a second negative slew rate of the second inductor.

33. The method of claim 24, wherein the first switching regulator stage pushes the first current to the first node during the first time period, and wherein the second switching regulator stage pulls the second current having a magnitude approximately equal to the first current from the second node through the capacitor during the second time period that follows the first time period.

34. The method of claim 24, wherein the second switching regulator stage pulls the second current from the second node through the capacitor during the first time period, and wherein the first switching regulator stage pushes the first current having a magnitude approximately equal to the second current to the first node during the second time period that follows the first time period.

35. The method of claim 24, further comprising:
generating, by the second switching regulator stage, the second current having a first polarity to the second node through the capacitor during the first time period, and in accordance therewith, changing the second voltage on the capacitor at the second node;
generating, by the second switching regulator stage, the second current having a second polarity opposite the first polarity during the second time period following the first time period to reset the voltage on the capacitor to the second voltage; and generating, by the first switching regulator stage, a third current to the first node comprising at least a current component having an approximately equal magnitude and opposite polarity to the second current during the second time period.

36. The method of claim 35, wherein the first current has a first slew rate and the third current has a second slew rate, and wherein the first slew rate is greater than the second slew rate.

37. The method of claim 24, wherein DC load current is provided to the first node by the first switching regulator stage and wherein AC current is provided to the first node through the capacitor by the second switching regulator stage.

38. The method of claim 24, further comprising:
coupling the first voltage on the first node to an input of a first control circuit, the first control circuit modifying the operation of the second switching regulator stage; and
coupling the second voltage on the second node to an input of a second control circuit, the second control circuit modifying the operation of the first switching regulator stage.

39. The method of claim 24, further comprising: coupling the first voltage on the first node to an input of a first circuit; and
coupling the second voltage on the second node to an input of a second circuit, wherein the first circuit has a first bandwidth for responding to a transient on the first node and the second circuit has a second bandwidth for resetting the second voltage on the second node, wherein the first bandwidth is greater than the second bandwidth.

40. The method of claim 24, further comprising coupling the second voltage on the second node to an input of a control circuit, the control circuit controlling the first switching regulator stage to produce a current in the first node to offset a corresponding current in the first node from the second switching regulator stage to reset the second voltage on the second node.

41. The method of claim 24, further comprising:
generating a first reference voltage to control the first voltage on the first node; and
generating a second reference voltage to control the second voltage on the second node, wherein the second reference voltage is greater than the first reference voltage.

42. The method of claim 41, wherein the second reference voltage is generated based on the first reference voltage and the first input voltage.

43. A switching regulator circuit, comprising:
a first switch having a first input terminal and a second terminal coupled to a first switching node;
a second switch having a first terminal coupled to the first switching node and a second terminal;
a first inductor having a first terminal coupled to the first switching node and a second terminal coupled to a first output node;
a third switch having a first input terminal and a second terminal coupled to a second switching node;
a fourth switch having a first terminal coupled to the second switching node and a second terminal;
a second inductor having a first terminal coupled to the second switching node and a second terminal coupled to a second output node;
a capacitor having a first terminal coupled to the first output node and a second terminal coupled to the second output node; and
a control circuit comprising a first feedback input coupled to the first output node, and a second feedback input coupled to the second output node, wherein the control circuit controls the first switch and the second switch to operate at a first duty cycle to produce a regulated first voltage on the first output node in response to the second feedback input, wherein the control circuit controls the third switch and the fourth switch to operate at a second duty cycle to produce a regulated second voltage on the second output node in response to the first feedback input, wherein during first and second time periods, a first current through the first inductor has a same increasing or decreasing operation as a second current through the second inductor, and wherein the first and second currents provide a voltage step at the regulated first voltage within the first and second time periods.

\* \* \* \* \*